(12) United States Patent
Sadanada

(10) Patent No.: US 7,697,455 B2
(45) Date of Patent: Apr. 13, 2010

(54) MULTIPLE REDUNDANCY SCHEMES IN AN OPTICAL NETWORK

(75) Inventor: Santosh Kumar Sadanada, Mountain View, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 1670 days.

(21) Appl. No.: 10/781,080

(22) Filed: Feb. 17, 2004

(65) Prior Publication Data

US 2009/0034971 A1 Feb. 5, 2009

(51) Int. Cl.
*H04L 12/28* (2006.01)

(52) U.S. Cl. .............. 370/254; 370/217; 370/220; 370/228; 370/419; 370/458

(58) Field of Classification Search ......... 370/217–223, 370/228, 244, 252, 392, 419, 442, 458; 714/6, 714/11, 13, 41
See application file for complete search history.

(56) References Cited

U.S. PATENT DOCUMENTS

| | | | | |
|---|---|---|---|---|
| 5,179,548 | A | * | 1/1993 | Sandesara ............... 370/222 |
| 5,307,353 | A | * | 4/1994 | Yamashita et al. ........... 714/4 |
| 5,351,146 | A | | 9/1994 | Chan et al. |
| 5,781,537 | A | | 7/1998 | Ramaswami et al. |
| 5,815,490 | A | * | 9/1998 | Lu ....................... 370/223 |
| 5,933,590 | A | | 8/1999 | Allen |
| 5,974,027 | A | * | 10/1999 | Chapman ............... 370/228 |
| 6,130,876 | A | | 10/2000 | Chaudhuri |
| 6,144,633 | A | * | 11/2000 | Ikeda et al. ............. 370/217 |
| 6,304,349 | B1 | | 10/2001 | Alanyali et al. |
| 6,332,198 | B1 | * | 12/2001 | Simons et al. ............... 714/6 |
| 6,445,844 | B1 | | 9/2002 | Neukermans et al. |
| 6,456,588 | B1 | * | 9/2002 | Simmons ............... 370/216 |
| 6,512,611 | B1 | * | 1/2003 | Phelps et al. ................. 398/4 |
| 6,587,235 | B1 | | 7/2003 | Chaudhuri |
| 6,643,041 | B1 | * | 11/2003 | Ikeda et al. ............... 398/79 |
| 6,657,952 | B1 | * | 12/2003 | Shiragaki et al. ......... 370/223 |
| 6,925,054 | B1 | * | 8/2005 | Atterton et al. .......... 370/218 |

(Continued)

OTHER PUBLICATIONS

PCT International Search Report and Written Opinion for PCT International Appln No. PCT/US08/78029 mailed Dec. 3, 2008. (11 pages).

(Continued)

*Primary Examiner*—Salman Ahmed
*Assistant Examiner*—Andrew C Lee
(74) *Attorney, Agent, or Firm*—Blakely, Sokoloff, Taylor & Zafman, LLP

(57) ABSTRACT

Methods and apparatuses for multiple redundancy schemes in an optical network are described herein. In one embodiment, an exemplary method includes receiving a demand for allocating a first protection path that meets a first set of disjointness constraints with respect to a first working path according to a first protection scheme having a first priority, in response to the demand, locating a second protection path that meets a second set of disjointness constraints with respect to a second working path according to a second protection scheme having a second priority, and assigning the second protection path as a protection path to the first working path if the first priority of the first protection scheme is higher than the second priority of the second protection scheme. Other methods and apparatuses are also described.

32 Claims, 19 Drawing Sheets

U.S. PATENT DOCUMENTS

| | | | |
|---|---|---|---|
| 6,973,267 B1* | 12/2005 | Arecco et al. | 398/4 |
| 2002/0003639 A1* | 1/2002 | Arecco et al. | 359/119 |
| 2002/0097671 A1 | 7/2002 | Doverspike et al. | |
| 2002/0126343 A1 | 9/2002 | Fumagalli et al. | |
| 2002/0154357 A1 | 10/2002 | Ozveren et al. | |
| 2002/0194339 A1 | 12/2002 | Lin et al. | |
| 2002/0196808 A1 | 12/2002 | Karri et al. | |
| 2003/0009582 A1 | 1/2003 | Qiao et al. | |
| 2004/0057375 A1* | 3/2004 | Shiragaki et al. | 370/216 |
| 2004/0057724 A1* | 3/2004 | Oksanen et al. | 398/5 |
| 2004/0120705 A1 | 6/2004 | Friskney et al. | |
| 2004/0190444 A1* | 9/2004 | Trudel et al. | 370/224 |
| 2004/0193724 A1* | 9/2004 | Dziong et al. | 709/232 |
| 2004/0205239 A1 | 10/2004 | Doshi et al. | |
| 2004/0218525 A1 | 11/2004 | Elie-Dit-Cosaque et al. | |
| 2004/0221058 A1* | 11/2004 | de Boer et al. | 709/238 |
| 2004/0258409 A1* | 12/2004 | Sadananda | 398/50 |
| 2005/0036442 A1 | 2/2005 | Saleh et al. | |
| 2005/0105905 A1* | 5/2005 | Ovadia et al. | 398/47 |

OTHER PUBLICATIONS

Rajiv Ramaswami et al., "Optical Networks, A Practical Perspective", Second Edition, Morgan Kaufmann Publishers, ISBN 1-55860-655-6, San Francisco, CA, USA. (831 pages), year 2002.

Capacity Performance of Dynamic Provisioning in Optical Networks (2001) Ramu Ramamurthy (pp. 40-48).

Dynamic Lightpath Establishment in Wavelength-Routed WDM Networks (2001) Hui Zang, Jason P. Jue (pp. 100-108).

Capacity Efficient Distributed Routing of Mesh-Restored Lightpaths in Optical Networks (2001) Sudipta Sengupta, Ramu Ramamurthy (5 pgs).

Inference of Shared Risk Link Groups, Internet Working Group, Internet Draft, Document: draft-many-inference-srlg-01.txt, Category: Internet Draft, Expires: Jan. 2002; D. Papadimitriou, F. Poppe, J. Jones, S. Venkatachalam Alcatel, S. Dharanikota, R. Jain, Nayna Networks, R. Hartani, Caspian Networks, D. Griffith, NIST, Yong Xue, UUNet, Jul. 2001 (32 pages).

Inter-domain routing with Shared Risk Groups, draft-many-ccamp-srg-01.txt, CCAMP Working Group, Internet Draft, Document: draft-many-ccamp-srg-00.txt, Category: Internet Draft, Expires: Jun. 2002; S. Dharanikota, R. Jain (Nayna), D. Papadimitriou (Alcatel), R. Hartani (Cespian Networks), G. Bernstein (Ciena), V. Sharma (Metanoia), C. Brownmiller, Y. Xue (Worldcom), Dec. 2001 (32 pages).

Cisco MPLS Tunnel Builder Pro, Cisco Systems, Inc., 1992-2002 (10 pages).

International Telecommunication Union, ITU-T G.7715/Y.1706 (Jun. 2002), Series G: Transmission Systems and Media, Digital Systems and Networks, Digital terminal equipments—Operations, administration and maintenance features of transmission equipment, Series Y: Global Information Infrastructure and Internet Protocol Aspects, Internet protocol aspects—Operation, administration and maintenance, Architecture and requirements for routing in the automatically switched optical networks, ITU-T Recommendation G7715/Y.1706 (35 pages).

Effectiveness of Shared Risk Link Group Auto-Discovery in Optical Networks, Panagiotis Sebos, Jennifer Yates, Dan Rubenstein and Albert Greenberg 2000 (3 pages).

Survivable Networks Algorithms for Diverse Routing by Ramesh Bhandari, Ph.D, AT&T Laboratories, New Jersey, Kluwer Academic Publishers, Boston/Dordrecht/London 1999.

Standards Report, Standards Update: Routing for Optical Networks, Greg Bernstein, Grotto Networking, and Lyndon Ong, Ciena Corp., IEEE Optical Communications, Aug. 2003 (p. S4 and S6).

* cited by examiner

CONNECTIVITY/ROUTING DATABASE(S) 250

| PATH 251 | LAMBDA 252 | LAMBDA STATUS 253 | COUNT OF 1:N 254 | PRIORITY OF WP FOR 1:N 255 | PRIORITIES OF WPS SHARED IN 1:N 256 | 257 |
|---|---|---|---|---|---|---|
| PATH 1 | LAMBDA 1 | ALLOCATED/WORKING | | 2 | | |
| PATH 1 | LAMBDA 2 | UNALLOCATED | | | | |
| ... | ... | | | | | |
| PATH 2 | LAMBDA 1 | ALLOCATED/WORKING | | 3 | | |
| PATH 2 | LAMBDA 2 | BROKEN | | | | |
| ... | ... | | | | | |
| PATH 3 | LAMBDA 1 | ALLOCATED/WORKING | | 5 | | |
| PATH 3 | LAMBDA 2 | ALLOCATED/WORKING | | | | |
| ... | ... | | | | | |
| PATH n | LAMBDA 1 | ALLOCATED/PROTECTION/1:1 | | | | |
| PATH n | LAMBDA 2 | ALLOCATED/PROTECTION/1:N | 3 | | 2, 3, 5 | |
| ... | ... | ... | ... | ... | ... | ... |

FIG. 2B

| SIGNALING DATABASE(S) ⎯301 | PROTECTION PATH (LAMBDA) ⎯302 | PRIORITIES OF WPS CURRENTLY SHARED IF IN 1:N PROTECTION SCHEME ⎯303 | |
|---|---|---|---|
| WORKING PATH (LAMBDA) | | | |
| 304⎯ PATH1/LAMBDA1 | PATH n/LAMBDA2 | 2 | ... |
| ⋮ | ⋮ | ⋮ | |
| 305⎯ PATH2/LAMBDA1 | PATH n/LAMBDA2 | 3 | |
| ⋮ | ⋮ | ⋮ | |
| 306⎯ PATH3/LAMBDA1 | PATH n/LAMBDA1 | - | |
| 307⎯ PATH3/LAMBDA2 | PATH n/LAMBDA2 | 5 | |
| ⋮ | ⋮ | ⋮ | ... |

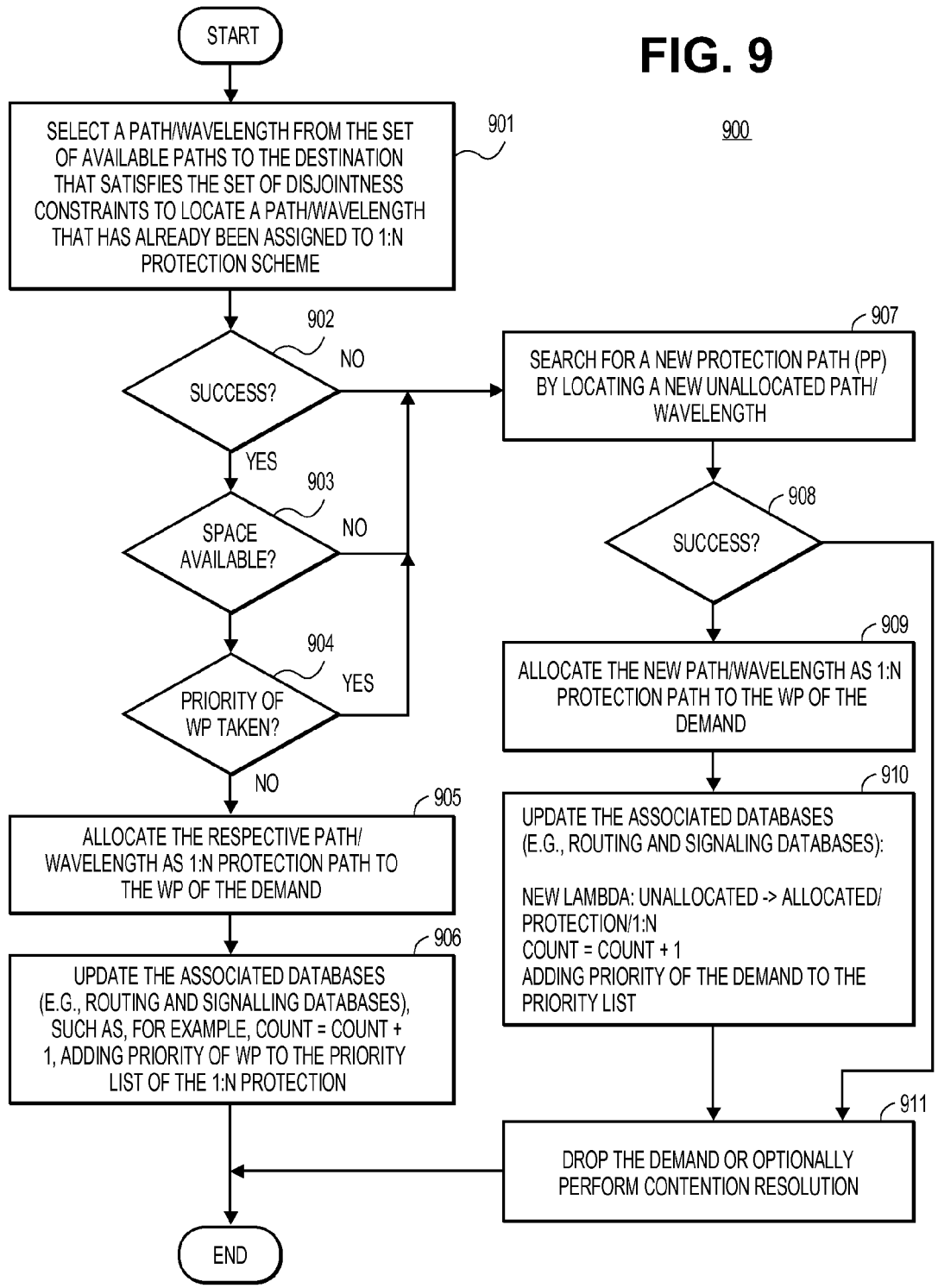

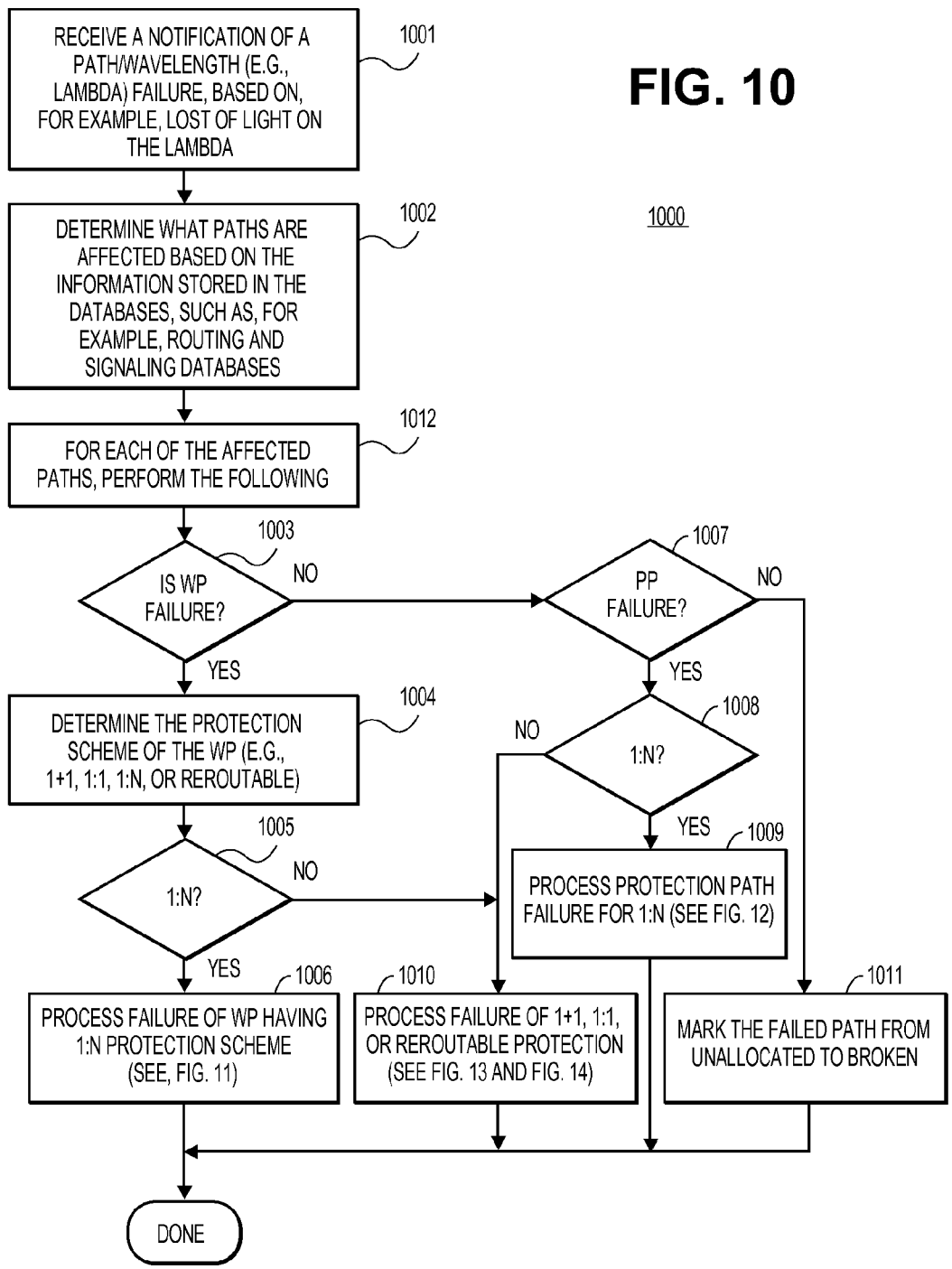

MULTIPLE REDUNDANCY SCHEMES IN AN OPTICAL NETWORK

FIELD OF THE INVENTION

The present invention relates generally to the field of networking. More particularly, this invention relates to multiple redundancy schemes in an optical network.

BACKGROUND OF THE INVENTION

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as access nodes; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lambda.

A lightpath is a one-way path in an optical network for which the lambda does not change. For a given lightpath, the optical nodes at which its path begins and ends are respectively called the source node and the destination node; the nodes (if any) on the lightpath in-between the source and destination nodes are called intermediate nodes. An optical circuit is a bi-directional, end-to-end (between the access nodes providing the ingress to and egress from the optical network for the traffic carried by that optical circuit) path through the optical network. Each of the two directions of an optical circuit is made up of one or more lightpaths. Specifically, when a given direction of the end-to-end end-to-end_path of an optical circuit will use a single wavelength, then a single end-to-end end-to-end_lightpath is provisioned for that direction (the source and destination nodes of that lightpath are access nodes of the optical network and are the same as the end nodes of the optical circuit). However, in the case where a single wavelength for a given direction will not be used, wavelength conversion is necessary and two or more lightpaths are provisioned for that direction of the end-to-end path of the optical circuit. Thus, a lightpath comprises a lambda and a path (the series of optical nodes (and, of course, the interconnecting links) through which traffic is carried with that lambda).

Put another way, when using GMPLS on an optical network, the optical network can be thought of as circuit switched, where LSPs are the circuits. Each of these LSPs (uni-directional or bi-directional) form an end-to-end path where the generalized label(s) are the wavelength(s) of the lightpath(s) used. When wavelength conversion is not used for a given bi-directional LSP, there will be a single end-to-end lightpath in each direction (and thus, a single wavelength; and thus, a single generalized label).

The term disjoint path is used to describe a relationship between a given path and certain other network resources (e.g., nodes, links, etc.). There are various levels of disjointness (e.g., maximally link disjoint, fully link disjoint, maximally node disjoint, and fully node disjoint; and each can additionally be shared risk group (SRG) disjoint). For instance, a first and second paths are disjoint if the network resources they use meet the required level of disjointness.

Disjoint paths are formed for a variety of reasons, including forming restricted paths and protection paths. Restricted paths are formed to carry traffic that is not to travel through certain network resources for security reasons. Protection paths are used to provide redundancy; that is, they are used as alternate paths to working paths in case of a network failure of some kind. Protection paths are commonly implemented as either: 1) 1+1 protected; 2) 1:1 protected; or 3) 1:N mesh restored. A 1+1 or 1:1 protected path is a disjoint path from node A to node B in the network where one of the paths is a working path, and the other is a protection path. The working path and the protection path are typically established at the same time. In the case of a 1+1 protected path, the same traffic is carried on both paths, and the receiving node selects the best of the paths (i.e., if the one currently selected by the receiving node degrades or fails, that node will switch to the other). In contrast, in the case of a 1:1 protected path, traffic is transmitted on the working path; when a failure occurs on the working path, traffic is switched to the protection path. A mesh restored path from node A to node B is a pair of shared resource group disjoint paths in the network, where one of the routes is a working path and the other is a backup path. The capacity dedicated on the backup path can be shared with backup paths of other mesh-restored lightpaths.

Typically, the paths (e.g., working or protection paths) are established and provisioned manually, for example, by a network administrator. Protection schemes used in a conventional optical network assumes there is only one failure at a time. When a second path failure occurs before the first failed path recovers, particularly, in a 1:N protection scheme, the traffic of the second failed path is dropped because the protection path is being used by the first failed path, until the network administrator can provision another path to take over the traffic of the second failed path.

In addition, an owner of an optical network typically has no discretion on how many working paths can share a 1:N protection scheme. Typically, when a demand for a path with 1:N protection is received, if there is no room for the 1:N protection, the demand is dropped.

SUMMARY OF THE INVENTION

Methods and apparatuses for multiple redundancy schemes in an optical network are described herein. In one embodiment, an exemplary method includes receiving a demand for allocating a first protection path that meets a first set of disjointness constraints with respect to a first working path according to a first protection scheme having a first priority, in response to the demand, locating a second protection path that meets a second set of disjointness constraints with respect to a second working path according to a second protection scheme having a second priority, and assigning the second protection path as a protection path to the first working path if the first priority of the first protection scheme is higher than the second priority of the second protection scheme.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 2A and 2B are block diagrams of an exemplary database organization according to certain embodiments of the invention.

FIG. 3 is a block diagram illustrating an example of a database organization according to anther embodiment of the invention.

FIG. 10 is a flow diagram illustrating an exemplary process for handling path failures according to one embodiment of the invention.

DETAILED DESCRIPTION

Figure 1:
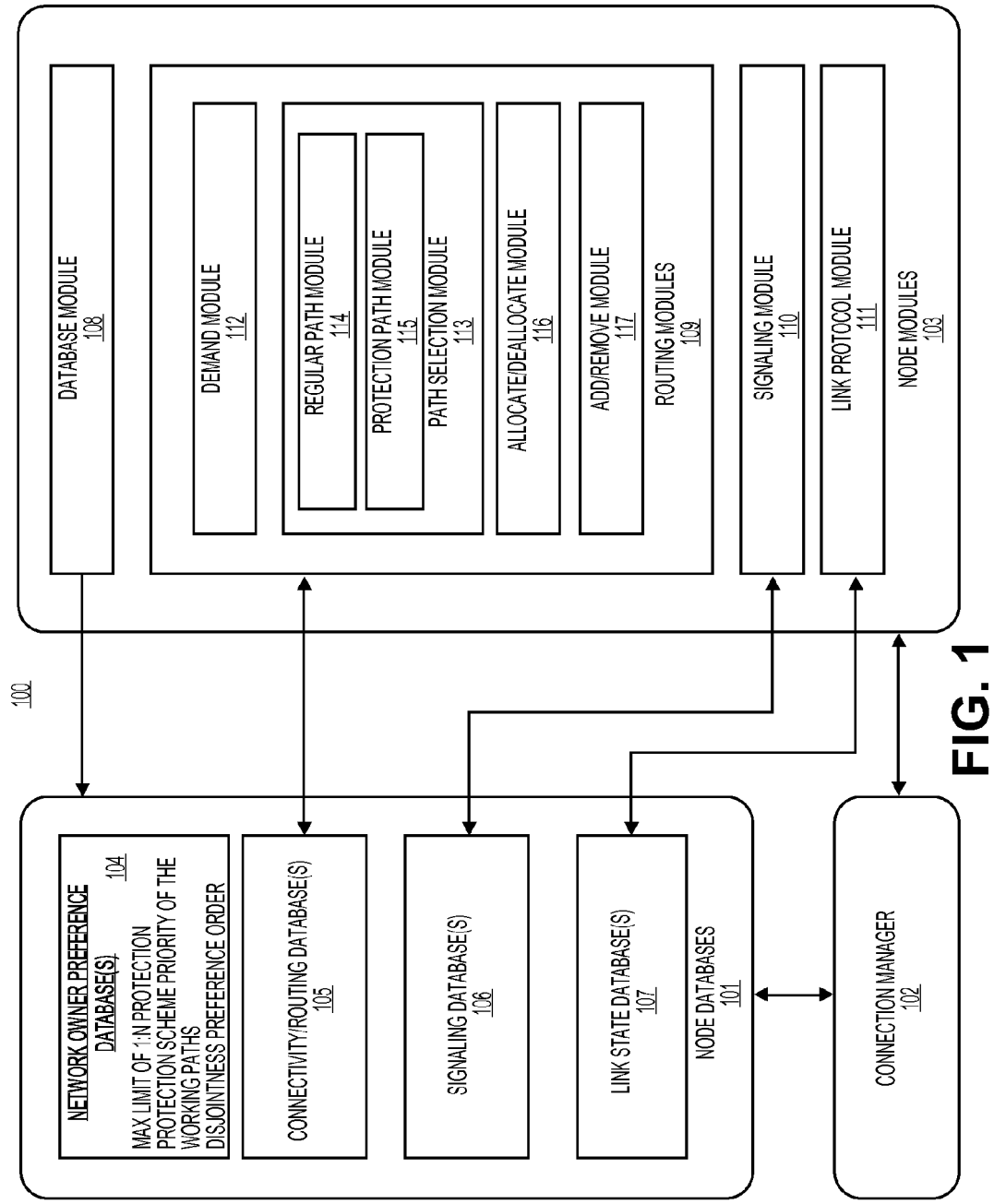
FIG. 1 is a block diagram illustrating an exemplary access node according to certain embodiments of the invention.

Multiple redundancy schemes in an optical network are described herein. In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Overview

According to one aspect of the invention, multiple failures of working paths sharing a protection path are handled dynamically. In certain embodiments, each of the working paths sharing a protection path is associated with a priority. No more than one working path having the same priority may share a protection path. The priorities of the working paths may be used to determine which working path claims the protection path when multiple working paths fail. A failed working path with higher priority claims the protection path, while the failed working path with lower priority is reallocated with another path.

According to an aspect of the invention, a service provider or a network owner is provided with a capability to assign a preference order of disjointness and a priority order of protection scheme. In certain embodiments, the preference order and protection scheme priority order may be used in a contention resolution process of paths, where for a particular service level an appropriate protection scheme demanded cannot be allocated. In certain embodiments, an existing path/wavelength combination with priority lower than the one in demand may be preempted and rerouted based on the disjointness preference order and the protection scheme priority order.

A path is a series of nodes and interconnecting links. By way of example, a lightpath is a path/wavelength combination (also referred to as path/wavelength or lambda, or channel). By way of another example, a bidirectional optical circuit has a path (where there is more than one lightpath in a given direction, it is the concatenation of the paths of these lightpaths). A working or protection path is made up of one or more lightpaths (e.g., a bidirectional working or protection path is a type of bidirectional optical circuit, whereas a unidirectional working path that is conversion free is made up of one lightpath).

Since each of the above aspects is independent, different embodiments may implement one or more of the above aspects of the invention. Of course, one or more parts of an embodiment of the invention may be implemented using any combination of software, firmware, and/or hardware. Such software and/or firmware can be stored and communicated (internally and with other access nodes over the network) using machine-readable media, such as magnetic disks; optical disks; random access memory; read only memory; flash memory devices; electrical, optical, acoustical or other form of propagated signals (e.g., carrier waves, infrared signals, digital signals, etc.); etc.

Exemplary Access Node Embodiments

According to one aspect of the invention, a database is built and maintained that stores available paths from a source node to reachable destination nodes in a network in which the links between nodes can carry multiple channels. Each of the available paths being a series of nodes and interconnecting links from the source node to one of the reachable destination nodes. In certain embodiments of the invention, the paths are stored in said database grouped by common destination nodes, there is a cost stored with each of the paths, and/or the paths are sorted. For example, in one embodiment of the invention, there is a cost stored with each of the paths, the paths are grouped by common destination node, and the paths in a group are sorted at least in part by their cost. In addition, each of the available paths has associated to it in the database a set of one or more of the channels on the interconnecting links available to form path/channel combinations (in a WDM network, these path/channel combinations would be path/wavelength combinations). Furthermore, each channel or path/wavelength may include status of that channel, such as, for example, the protection scheme, the priority of the channel for the 1:N protection, etc. While the invention is not limited to WDM network, the invention will be described with reference to WDM networks for illustrative purposes. Such a database may be built, maintained, structured, used, etc. in a variety of ways; exemplary ones of which are described herein.

According to another aspect of the invention, a database that stores available paths from a source node to reachable destination nodes is used for handling one or more channel failures. In certain embodiments of the invention, a path is selected from the database based on its destination. Following the selection of the path, a wavelength available on that path is selected from the database. In certain embodiments of the invention, such paths are paths that meet a set of disjointness constraints (e.g., maximally link disjoint, fully link disjoint, maximally node disjoint, fully node disjoint, as well as optionally shared risk group disjoint) selected through the determination of intersection sets of the network resources (e.g., nodes and/or links) of available paths in the database.

FIG. 1 is a block diagram illustrating an exemplary access node according to certain embodiments of the invention. While FIG. 1 illustrates an access node for use in a source based scheme, the invention is not so limited. The exemplary node shown in FIG. 1 may be implemented within a control plane, a data plane, or a combination of both the control and data planes of a node.

In one embodiment, the exemplary node 100 includes, but not limited to, one or more node databases 101, a connection manager 102, and one or more node modules 103. In one embodiment, the node databases 101 include a connectivity database 105 (also referred to as a routing database), a link state database 107, and a network owner preference database 104. The node databases 101 may be implemented as multiple databases linked with each other. Alternatively, databases 101 may be implemented as a centralized database globally managed by, for example, database module 108. In addition, portions or all of the information stored in each database may be duplicated and stored in a local database accessible by one or more modules of the node modules 103. Other configurations apparent to those with ordinary skill in the art may exist.

Figure 16:
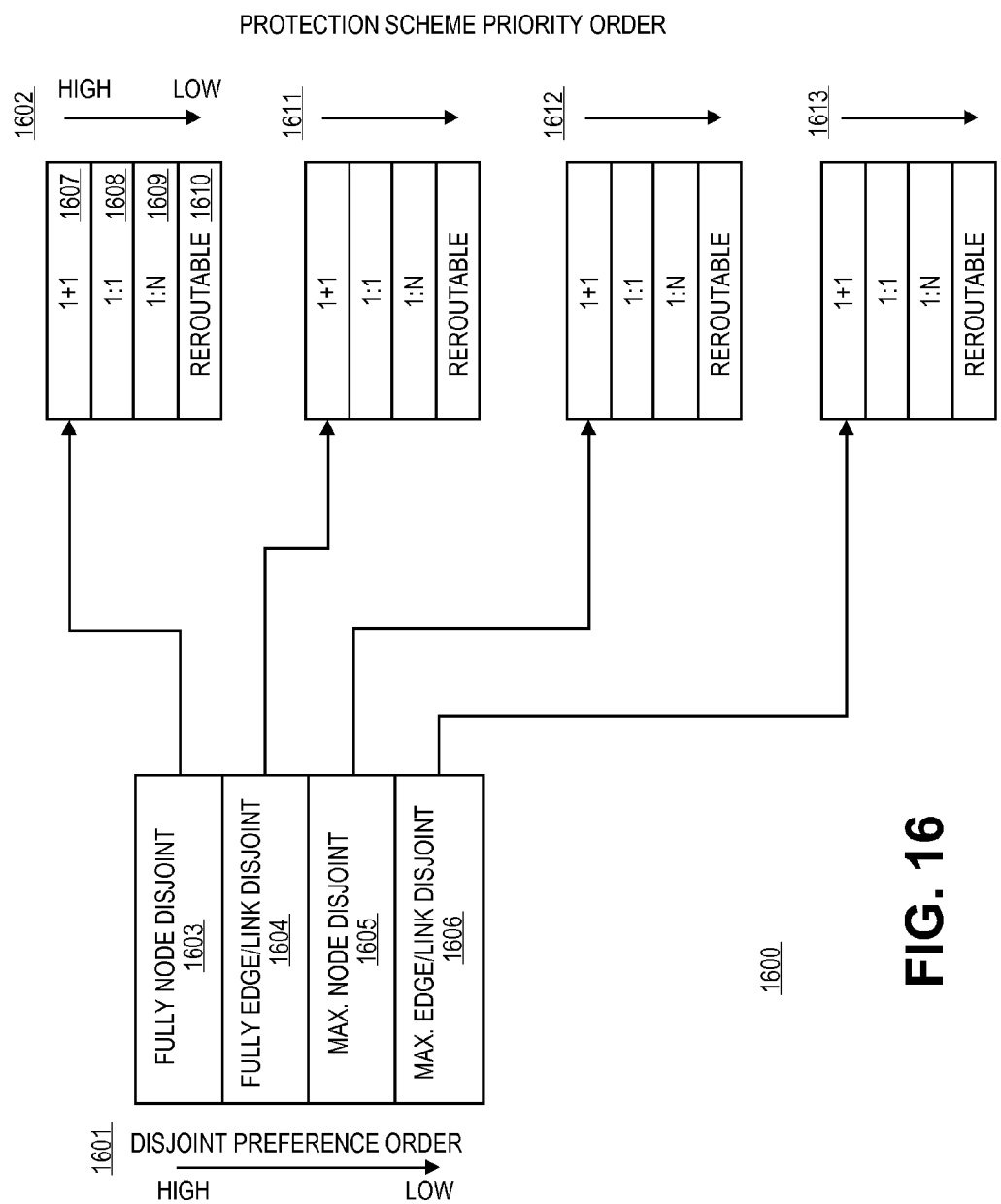
FIG. 16 is a block diagram illustrating an exemplary disjointness preference order and an exemplary protection scheme priority order, according to one embodiment of the invention.

In one embodiment, the network owner preference database 104 includes a set of information concerning the preferences that a network owner or a service provider may have regarding operations of the network or the respective node. For example, according to one embodiment, the preference database 104 may include, among others, the number of working paths that can share a 1:N protection path. In addition, the preference database 104 may further include the protection scheme priority order that the network owner or the service provider may prefer during an allocation or a contention resolution of a protection path, when a protection path demanded cannot be allocated at a given time. An example of the protection scheme priority order is shown in FIG. 16 and the embodiments of contention resolution schemes are described in details further below.

In one embodiment, the link state database 107 includes a set of one or more link state structures (not shown), one for each link connected to that node. While in certain embodiments these links are discovered through a link management protocol (e.g., a link protocol module), alternative embodiments could use other techniques. In certain embodiments of the invention, each link state structure records a neighboring node, a port through which that neighboring node is connected (fiber links end up at a port on the node), and available wavelengths on that link (through the port).

Figure 2A:
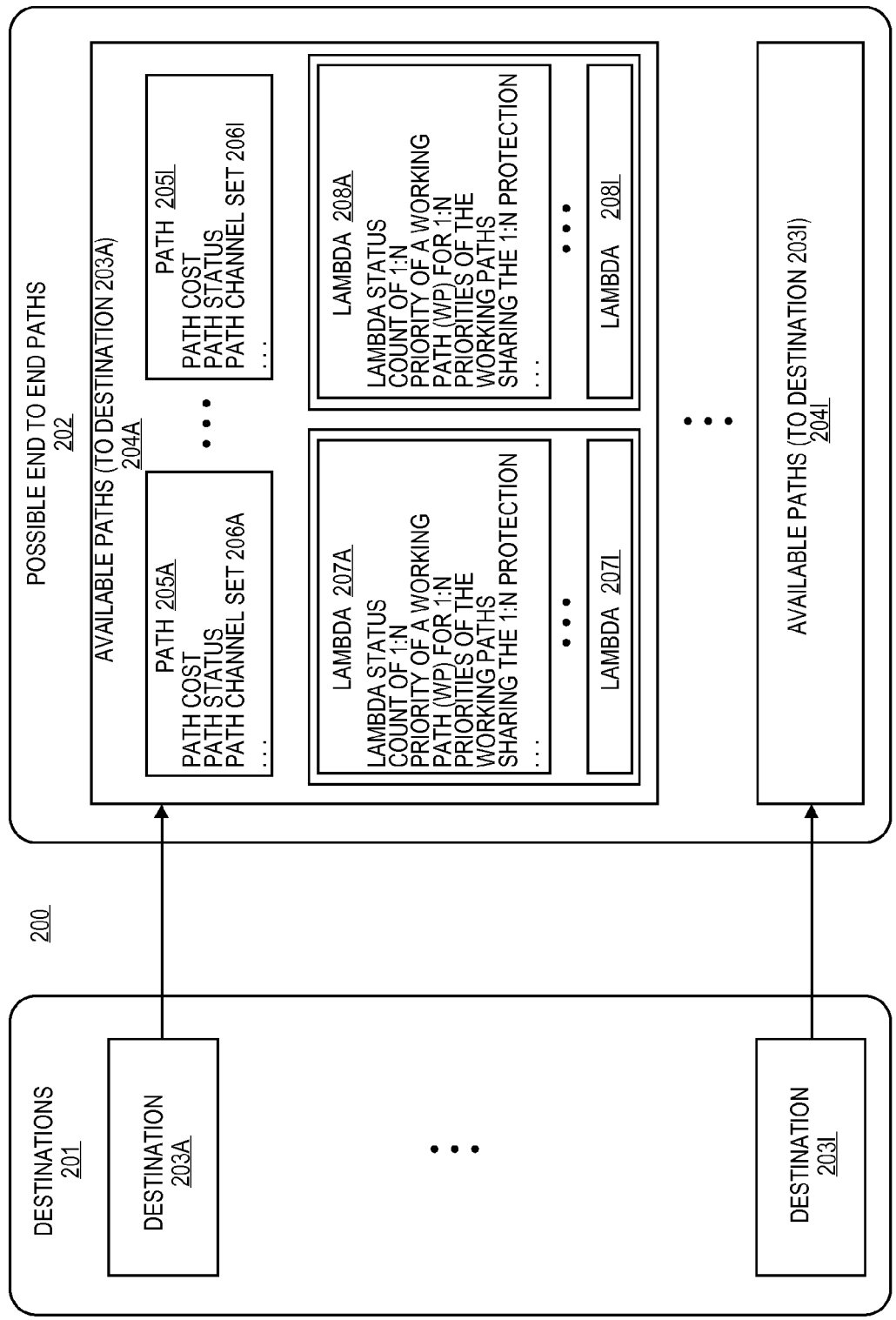

In one embodiment, the connectivity database 105 includes a set of one or more structures to store the available paths. The connectivity database 105 may also store the configuration of the cross connect of the node. Exemplary embodiments of the connectivity database 105 are illustrated in FIGS. 2A and 2B.

In one embodiment, signaling database 106 includes a set of information, including, but not limited to, the working path and protection path pairs and optionally their respective status. An exemplary embodiment of the signaling database 106 is shown in FIG. 3.

In one embodiment, the node modules 109 include, but not limited to, a database module 108, a set of one or more routing modules 109, a signaling module 110, and a link protocol module 111. In one embodiment, the routing modules 109 include, but not limited to, a demand module 112, a path selection module 113 (which may include a regular path module 114 and protection path module 115), an allocate/deallocate module 116, and an add/remove module 117. It will be appreciated that other modules, such as, for example, a protection module, etc., may be included.

In one embodiment, the database module 108 builds and maintains one or more databases 101, such as, for example, connectivity database 105. There are a variety of techniques for doing so, exemplary ones of which are described later herein. The demand module 112 receives demands for new path/wavelength combinations and invokes the path selection module 113 and allocate module 116 to service the demand.

In one embodiment, the path selection module 870 includes a regular path module 114 and a disjoint path module 115. The path selection module 113 receives requests for paths and the path selection criteria and invokes the appropriate one(s) of the regular path module 114 and disjoint path model 115 for selecting a regular path (e.g., a working path) and/or a protection path respectively.

The allocate module 116 causes the selected path/wavelength combinations to be allocated (e.g., the access node's cross connect and connectivity/routing database 105, as well as, in certain embodiments, communication to other nodes), while the deallocate module causes path/wavelength combinations to be deallocated. The add/remove module 117 addresses additions and removals of channels, links, and nodes in the optical network. The protection module (not shown) is called responsive to the add/remove module 117 to implement a redundancy scheme.

In one embodiment, signaling module 110, among other things, is responsible for signaling the nodes along a path indicating the path is up or down. For example, when a demand for a path is issued, the signaling module 110 receives such a demand. Signaling module 110 may pass the demand to the routing modules 109 to request a working path and optionally a protection path associated with the work path. In response to the demand, the routing modules 109 may, for example, via path selection module 113 and/or allocate module 116, access the connectivity/routing database 105 to select a working path and/or a protection path for the demand. In one embodiment, the demand may include a protection scheme demanded, such as, for example, 1+1, 1:1, 1:N, or reroutable protection scheme. In another embodiment, the demand may further include a priority of a working path demanded if the demand demands for 1:N protection. In an alternative embodiment or where the demand does not include a priority, the priority may be assigned by the node (e.g., signaling module or LMP module), for example, in a first-come-first-serve manner. The routing modules 109 may allocate a working path and a protection path based on this information.

If a protection path demanded cannot be allocated, according to one embodiment, the routing modules 109 may optionally perform contention resolution based on a disjointness preference order and a protection scheme priority order, for example, a lower disjointness, based on a preference order stored in the preference database 104, which may preempt an existing allocated path. The preempted existing path may then be rerouted according to one or more routing policies. The disjointness preference order and the protection scheme priority order may be set up or specified by an owner of the network.

Thereafter, the routing modules 109 pass the path allocation information to the signaling module 110, which in turn signals the nodes associated with allocated path. Once the nodes of the path have been signaled, the traffic of the path may occur. Once the paths have been allocated and signaled, the routing modules 109 may update the connectivity/routing database 105 reflecting the path allocations (as shown in FIGS. 2A and 2B), while signaling module 110 may also update the corresponding signaling database 106 (as shown in FIG. 3).

In one embodiment, connection manager 102 is responsible for managing the connections of the node. Connection manager 102 typically communicates with the hardware of the nodes (e.g., physical layers of the network stack or a data plane). Connection manager 102 communicates with node modules 103 and may access one or more databases 101. Communication manager 102 may communicate with the hardware via one or more device drivers of an operating system, such as, for example, Linux or other operating systems.

The node databases 101 may be built and maintained, and the paths may be established and provisioned using a variety of techniques. According to one embodiment, the node databases 101 and the paths may be established and provisioned dynamically using service level topologies, which detailed information may be found in a co-pending U.S. patent application Ser. No. 10/754,931, filed Jan. 9, 2004, entitled "A Method and Apparatus for a Network Database in an Optical Network", and assigned to a common assignee of the present application. The above-identified U.S. patent application is hereby incorporated by reference.

Exemplary Database Organizations

FIGS. 2A and 2B illustrate two exemplary connectivity/routing database(s) organizations according to embodiments of the invention.

FIG. 2A is a block diagram of an exemplary database organization according to one embodiment of the invention. FIG. 2A illustrates a destinations structure 201 and representation of the possible end-to-end paths 202. The destinations structure 201, having entries destination 203A to 203I, is to store each of the reachable destinations in a single entry. Each of the destination entries 203A to 203I is associated with the available paths to that destination 204A to 204I. Specifically, in FIG. 2A the destination 203A has associated to it paths 205A-205I. In other words, the available paths are grouped by common destinations. Each path has associated to it its path channel set; paths 205A-205I respectively have path channel sets 206A-206I. Each of these path channel sets 206A-206I includes a set one or more lambdas (e.g., path channel set 206A includes lambdas 207A-207I; path channel set 206I includes lambdas 208A-208I).

FIG. 2A additionally shows that each path has a path cost and a path status. The path costs are to identify the relative costs of the paths so that they may be distinguished for shortest path purposes. It should be noted that this cost is on a per path basis, as opposed to a per path/wavelength combination basis. The path status identifies the status of the path (e.g., up, down, etc.—where up means that the path is usable and down means that the path is currently not usable (e.g., a path may have a status down if one or more links in the path has been removed).

In addition, each lambda has stored with it a lambda status. The lambda status may not be limited to being allocated or unallocated. For example, a lambda that has failed due to a fiber cut or laser failure could be assigned a status of "broken". For embodiments in which only bi-directional paths can be allocated, the granularity for tracking allocated/unallocated status is simply the lambda level. However, in embodiments that allow for unidirectional path allocation, the granularity of allocated/unallocated status is a status for each direction for each lambda.

Figure 4:
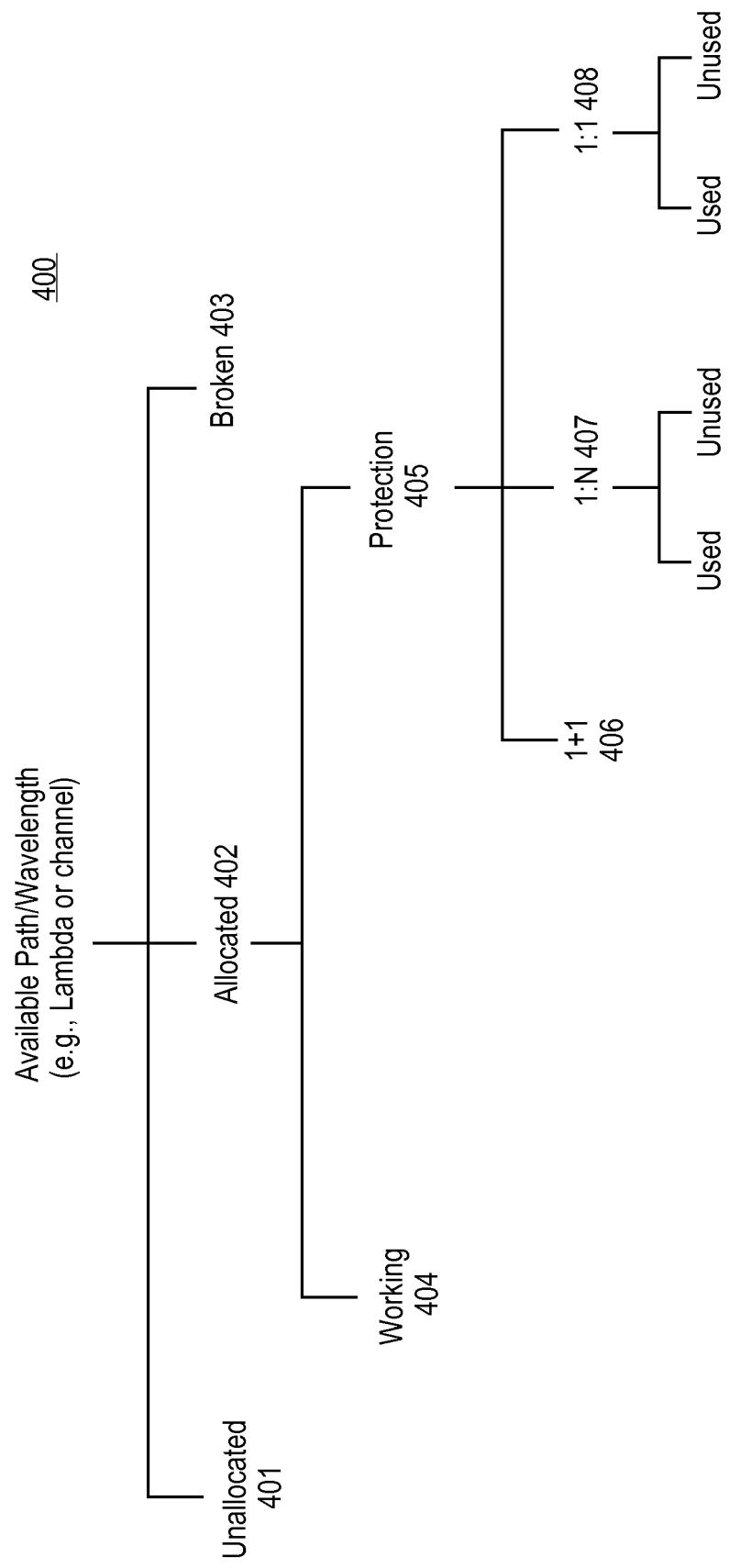
FIG. 4 is a block diagram illustrating an example of channel or wavelength statuses according to certain embodiments of the invention.

Furthermore, in the case for 1:N protection, according to one embodiment, each lambda may also include: 1) for a path/wavelength combination used for a 1:N protection path, the number of the working paths currently sharing the 1:N protection, the priorities of the working paths currently sharing the 1:N protection; and 2) for a path wavelength combination used for a working path, the priority of that working path. An example of the lambda status embodiments is illustrated in FIG. 4.

As a result, based on a given destination, the database can be accessed to locate the available paths to that destination (e.g., the group of paths to select from for allocation can be located). In certain embodiments of the invention, the paths for each destination are also sorted by a set of one or more path characteristics (e.g., any available wavelengths, number of available wavelengths, the cost, load balancing issues, etc.). As a result, depending on the sort, the next path to select for allocation to a given destination will more likely be at the beginning of the group. Once a path is selected, the available wavelengths on that path and their status can be accessed for selection therefrom. In certain embodiments of the invention, the wavelengths of a path channel set are sorted by lambda status so that the next unallocated lambda to select more likely at the beginning of the set.

The exemplary organization of the database in FIG. 2A could be implemented in a variety of ways. For example, the destinations structure 201 could be stored as a separate structure (e.g., a linked list, a tree, etc.), each entry of which includes a pointer to a structure (e.g., a linked list, a tree, etc.) for each group of paths; each entry for the path group structure could include a pointer to a structure (e.g., a linked list, a set, etc.) for the path channel set of that path.

While FIG. 2A illustrates an exemplary database organization, it should be understood that alternative embodiments of the invention could have different organizations and structures. For example, rather than having a separate destinations structure, the paths could be grouped through the sorting of a table having each path as an entry; rather than having a separate lambdas structure for each path, the available lambdas could be stored along with the path. As yet another example, while certain information is stored along with the paths and lambdas (cost and status), alternative embodiments could store more, less, and/or different information.

It should be understood that different embodiments of the invention may rely on different relationships of sorting and searching. For instance, while in certain embodiments the lambdas in the path channel sets are sorted, alternative embodiments of the invention may rely on searching an unsorted path channel set. As another example, while certain embodiments of the invention sort the paths by cost and whether there are any unallocated channels thereon, alternative embodiments of the invention may sort the paths in the groups by cost but not by whether there are any unallocated channels; such embodiments would rely on searching to locate the lowest cost path with an unallocated channel.

FIG. 2B is a block diagram illustrating an example of database organizations according to another embodiment of the invention. The exemplary database 250 may be implemented within a connectivity/routing database, such as, connectivity database 105 of FIG. 1, accessed and maintained by routing modules 109. Alternatively, the database 250 may be implemented across multiple databases, such as, connectivity database 105, signaling database 106, and/or link state database 107, etc. For example, portions or all of the information of database 250 may be duplicated at each of the databases, such as those shown in FIG. 1. In one embodiment, exemplary database 250 may be implemented as possible end-to-end paths 202 of a variety of destinations as shown in FIG. 1.

Referring to FIG. 2B, in this embodiment, the database 250 is organized based on the possible end-to-end paths. In one embodiment, the database 250 includes, but is not limited to, the fields of path 251, the lambda of the path 252 (e.g., wavelength or lambda), lambda status 253, the number of the working paths currently sharing a 1:N protection 254 (if the path/wavelength combination is being used for a 1:N protection path), the priority of the path 255 (if it is a working path currently sharing 1:N protection), priorities of the working paths currently sharing the 1:N protection 256 (if it is a 1:N protection path), and other fields 257 apparent to those with ordinary skill in the art.

According to one embodiment, the database was organized by indexing all the paths managed by the respective node. The field 251 is used to list one or more paths to a destination node. As described above, each path may include multiple channels (e.g., lambdas or wavelength in a WDM optical network). Field 252 is used to specify a channel on the path indicated by field 251. In a WDM optical network, fields 251 and 252 may be used to specify a path and wavelength combination (e.g., a lambda). For the purposes of illustrations, a path and wavelength combination may be referred to as path/wavelength or path/channel. For example, for the path 258, it may be described as path1/lambda1, which indicates as a path having lambda1 (e.g., a wavelength having a frequency of lambda1) within path 1 from a source node to a destination node.

Lambda status field 253 may be used to specify the current status of the path/lambda combination (e.g., path/wavelength combination). For example, according to one embodiment, lambda status field 253 may include at least one of the lambda statuses shown in FIG. 4, which will be described in details further below. In addition, the lambda status field 253 may also be used to indicate the type of the respective path/lambda combination. For example, path 258 is a path1/lambda1 combination and it is also an allocated working path having a status of allocated/working. Path 259 is a path1/lambda2 combination and it is an unallocated path having a status of unallocated, which may be subsequently allocated as a working path or a protection path.

The count of 1:N protection field 254 may be used to indicate the number of working paths currently sharing the 1:N protection path (where the path/wavelength combination is being used for that purpose). According to one embodiment, a 1:N protection path may be used by a predetermined number of working paths, which may be specified by a network owner or a service provider. In one embodiment, the maximum number of working paths that may share a 1:N protection path may be specified in a network owner or service provider preference database, such as, for example, preference database 104 of FIG. 1. That is, a network owner or service provider may specify during the configuration or at real-time the maximum number of the working paths that are allowed to share the same 1:N protection. In one embodiment, the maximum number of working paths that may share a 1:N protection is six.

As described above, when a demand for a working path with a 1:N protection is received, the demand may include a priority of a working path in demand with 1:N protection. Alternatively, the priority may be assigned by the network according to one or more policies, such as, for example, a first-come-first-serve manner. According to one embodiment, no more than one of the working paths having the same priority would be allowed to share the same 1:N protection path. Where a path/wavelength combination is currently being used as a working path that is protected by 1:N protection, the priority of the working path field 255 may be used to store the priority of that working path. When more than one working paths fail that share the same 1:N protection path, the priority of the working paths may be used to determine which working path would obtain the 1:N protection path. According to one embodiment, the working path with higher priority will obtain the 1:N protection path while the one with lower priority may be allocated with a new path or rerouted.

Dependent upon the respective network configuration, the maximum number of working paths may vary. For example, for higher 1:N protection, the maximum number of working paths that can share the 1:N protection may be lower, while the cost to maintain such a configuration may be higher. Likewise, for lower 1:N protection, the maximum number of working paths that can share the 1:N protection may be higher, while the cost to maintain such a configuration may be lower. When configuring a network, according to one embodiment, the network owner or service provider is provided an opportunity to specify number of the working paths that can share a 1:N protection. The network owner or service provider may balance the considerations of the protection level and the cost to maintain such a protection level of a network when configuring the network.

According to one embodiment, the exemplary database 250 further includes a field 256 for a 1:N protection path to store the priorities of the working paths currently sharing with the respective 1:N protection path. Field 256 may be used by a 1:N protection path to indicate the priorities of the working paths currently sharing the 1:N protection path. For example, path 265 is a 1:N protection path that are currently shared with three working paths: path 258 having a priority of 2, path 260 having a priority of 3, and path 263 having a priority of 5. The number of the working paths currently sharing the 1:N protection path 265 is indicated in the respective field 254. The priorities of the working paths 258, 260, and 263 are indicated in the respective field 256.

According to one embodiment, the count of the 1:N protection stored in the field 254 may be used to determine whether the respective 1:N protection path may be shared with an additional working path. For example, the 1:N protection path 265 currently has three working paths sharing with it, if the maximum number of working paths that can share with one 1:N protection is three, which may be specified in a network owner or service provider preference database 104 of FIG. 1, when a new demand for a 1:N protection is received, the current 1:N protection path 265 may not be assigned to the new demand because its count of working paths currently sharing (e.g., three as indicated in field 254) has reached the maximum limit. As a result, another or a new 1:N protection path may be allocated to the new demand.

According to one embodiment, the priorities of the working paths 258, 260, and 263 stored in the field 256 may be used to determine whether the respective 1:N protection can be shared with an additional working path having a specific priority. Since no more than one working path having the same priority can share the same 1:N protection path, the field 256 may be used to determine whether the 1:N protection has already a working path that has the same priority as the one in demand, and if so, the 1:N protection path cannot be allocated to the demand.

For example, the 1:N protection path 265 is shared with three working paths (e.g., working paths 258, 260, and 263) having priorities of 2, 3, and 5. If a new demand having a priority of 2 is received, the field 254 is checked whether number of the working paths currently supported by the 1:N protection path 265 has reached the maximum number. It is assumed that the maximum number of the working paths that can share a 1:N protection path is six. Since the number of the working paths currently sharing the 1:N protection path 265 is three as indicated in field 254, the field 256 is then checked whether the 1:N protection path 265 is already supporting a working path having the same priority of the demand. In this example, the 1:N protection path 265 is already supporting a working path having the same priority of 2 (e.g., working path 258). As a result, the 1:N protection path 265 cannot be shared by the demand, and another or a new 1:N protection path may be allocated for the demand.

It will be appreciated that other information or fields, such as, for example, whether the 1:1 or 1:N protection path is being used or whether a path is reserved while the signaling module is signaling the nodes of the path, etc., may be stored in the database 250, such as field 257.

FIG. 3 is a block diagram illustrating an example of a database organization of a signaling database according to one embodiment of the invention. The exemplary database 300 may be implemented as part of a signaling database, such as, signaling database 106 of FIG. 1. Alternatively, the exemplary database 300 may be implemented across multiple databases, such as, connectivity/routing database 105, signaling database 106, link state database 107, etc. Portions or all of the information stored in database 300 may be duplicated in other databases.

Referring to FIG. 3, according to one embodiment, exemplary database 300 includes, but not limited to, working path field 301, protection path field 302, and the priority of the working path field 303 if the working path is in a 1:N protection. The working path field 301 is used to store an identity of a working path and the protection path field 302 is used to store an identity of a protection path associated with the working path identified by field 301. If the protection scheme for the working path is a 1:N protection, the field 303 is used to store a priority of the working path identified by the working path field 301.

For example, as illustrated in FIG. 3, record 304 includes a working path path1/lambda1 stored in the respective field 301 and a protection path pathn/lambda2 stored in the respective field 302. The priority of the working path is indicated in the field 303 as 2, which also indicates the protection scheme is a 1:N protection scheme. The protection scheme (e.g., 1:1, 1+1, etc.) may also be determined based on the status of the protection path pathn/lambda2 from other databases, such as, protection path 265 shown in FIG. 2B.

According to one embodiment, the exemplary database 300 may be accessed and maintained by a signaling module, such as signaling module 110 of FIG. 1. However, it is not so limited. The database 300 may also be accessed by other modules, such as those shown in FIG. 1. When one or more channels or paths fail, according to one embodiment, the database 300 may be used by the signaling module to determine how to handle the traffic of the failed paths. The signaling module may be notified of the failure by the connection manager (e.g., connection manager 102 of FIG. 1).

For example, when a working path path1/lambda1 fails, the signaling module may determine the protection path corresponding to the failed working path. In this example, the protection path for the working path path1/lambda1 is pathn/lambda2 indicated by the respective field 302. In response to the notification of the failures, the signaling module may switch the traffic of the failed working path (e.g., path path1/lambda1) to its protection path (e.g., path pathn/lambda2) and signal the nodes associated with the protection path to notify them that the traffic has been switched over to the protection path. Thereafter, the signaling module may notify the connectivity/routing database (e.g., database 105 of FIG. 1) to update the status of the working path and the protection path. For example, the status of failed working path path1/lambda1 may be changed from allocated/working to broken and the status of the protection path pathn/lambda2 may be updated from allocated/protection/1:N to allocated/protection/1:N/ used, which may be reflected in the databases shown in FIGS. 2A and 2B. Other information or databases may also be updated.

When more than one path failure occurs in a 1:N protection scheme, according to one embodiment, the priority of a working path indicated in field 303 may be used to determine which failed working path gets the 1:N protection path. In a particular embodiment, the working path having higher priority may get the 1:N protection path, while the traffic of the working path having lower priority may be rerouted according to one or more policies.

For example, referring to FIG. 3, when working path path2/lambda1 of record 305 fails, the signaling module switches the traffic of path2/lambda2 to its corresponding protection path pathn/lambda2 and notifies the connectivity/routing database (e.g., databases 200 or 250 shown in FIGS. 2A and 2B). The status of the working path path2/lambda2 may be changed from allocated working to broken and the status of the protection path pathn/lambda2 may be changed from allocated/protection/1:N to allocated/protection/1:N/used in databases 200 and 250 of FIGS. 2A and 2B.

Subsequently, for the purposes of illustration, it is assumed that before the failed working path path2/lambda1 recovers, another working path path1/lambda1 of record 304 also fails. Since the corresponding 1:N protection path pathn/lambda2 has been used by the first failed working path (e.g., path2/lambda1), according to one embodiment, the signaling module may compare the priorities of two failed working paths (e.g., path1/lambda1 and path2/lambda2) and determine which working path gets the protection path (e.g., pathn/lambda2). In this example, since the second failed working path path1/lambda1 of record 304 has a higher priority (e.g., priority of 2) than the priority of the first failed working path path2/lambda1 (e.g., priority of 3), the second failed working path will get the 1:N protection path pathn/lambda2 and the traffic currently on the protection path pathn/lambda2 for the first failed working path (e.g., path2/lambda1) may be rerouted. In one embodiment, a new working path and/or a new protection path may be allocated for the first failed working path (e.g., path2/lambda1). The above transactions will be described in details further below.

According to one embodiment, when a protection path fails, which is currently carrying traffic for a failed working path, the signaling module may check whether the failed working path has recovered. If so, the traffic of the failed protection may be switched back to the recovered working path and optionally a new protection path may be allocated.

According to another embodiment, when a failed or broken working path recovers, the traffic of the corresponding protection path on behalf of the broken working path may be switched immediately back to the recovered working path. As a result, the status of the recovered working path may be changed from broken to allocated/working and the status of the protection path may be changed from allocated/protection/1:1 or 1:N/used to allocated/protection/1:1 or 1:N.

Alternatively, according to a further embodiment, when a failed working path recovers, the recovered working path may be released back to the unallocated pool and its status may be changed from broken to unallocated. In this embodiment, the protection path that takes over the traffic for the failed and now recovered working path may act as a working path. The status of the protection path taking over may be changed from allocated/protection to allocated/working. A new protection path may be allocated for the newly converted working path. Other operations or configurations exist and are within the scope of the invention.

Exemplary Channel Status/States Embodiments

As described above, the channel or wavelength (lambda) statuses may be stored in one or more databases, such as databases shown FIGS. 2A-2B and 3. The channel or wavelength statuses may be used when establishing a working path, a protection path, and/or alternatively, for handling one or more path failures. FIG. 4 is a block diagram illustrating an example of channel or wavelength statuses according to certain embodiments of the invention. Referring to FIG. 4, in one embodiment, the exemplary channel statuses 400 includes, but not limited to, unallocated status 401, allocated status 402, and broken status 403. Although the statuses 400 may be used in a variety of optical networks, for the purposes of illustrations, a WDM optical network is used as an example throughout this application. It will be appreciated that the embodiments described herein are not limited to WDM optical networks. They may be applied to other types of networks.

According to one embodiment, when a channel (path/wavelength in a WDM optical network) is unallocated (e.g., having unallocated status 401), the channel is free to be allocated to any new demand, either as a working path or a protection path. When a channel or path/wavelength is down, the respective channel or path/wavelength combination may be marked as broken (e.g., having a broken status 403). When a path is allocated, it may be allocated as a working path having an allocated/working status 404 or a protection path having an allocated/protection status 405.

In one embodiment, multiple protection schemes are supported. A path may be allocated as a protection path having a 1+1 protection scheme with an allocated/protection/1+1 status 406, a protection path having a 1:1 protection scheme with an, allocated/protection/1:1 status 407, or a protection path having a 1:N protection scheme with an allocated/protection/1:N status 408. In addition, the 1:1 and 1:N protection path (e.g., having allocated/protection/1:1 status 408 and allocated protection/1:N status 407) may be in use, when the protection path takes over the traffic of its corresponding working path. In such case, the status of the respective protection path may be referred to as allocated/protection/1:1 or 1:N/used and the status of the failed or broken working path may be referred to as broken status 403. Otherwise, when the working path is still up, its protection path status may be referred to as allocated/protection/1:1 or 1:N/unused or simply allocated/protection/1:1 or 1:N, because it is not being used.

Furthermore, when a path is allocated, either as a working path or a protection path, the allocated path may be temporarily marked as reserved (not shown). This status may be used when a path is allocated, but waiting for the signaling module to signal the nodes of the allocated paths and return the status of whether the signaling operations are successful. The reserved status may be used to prevent any new demand to allocate the same path while waiting for the confirmation of the signaling module whether the signaling has been performed successfully. Other statuses apparent to those with ordinary skill in the art may be used.

Figure 5:
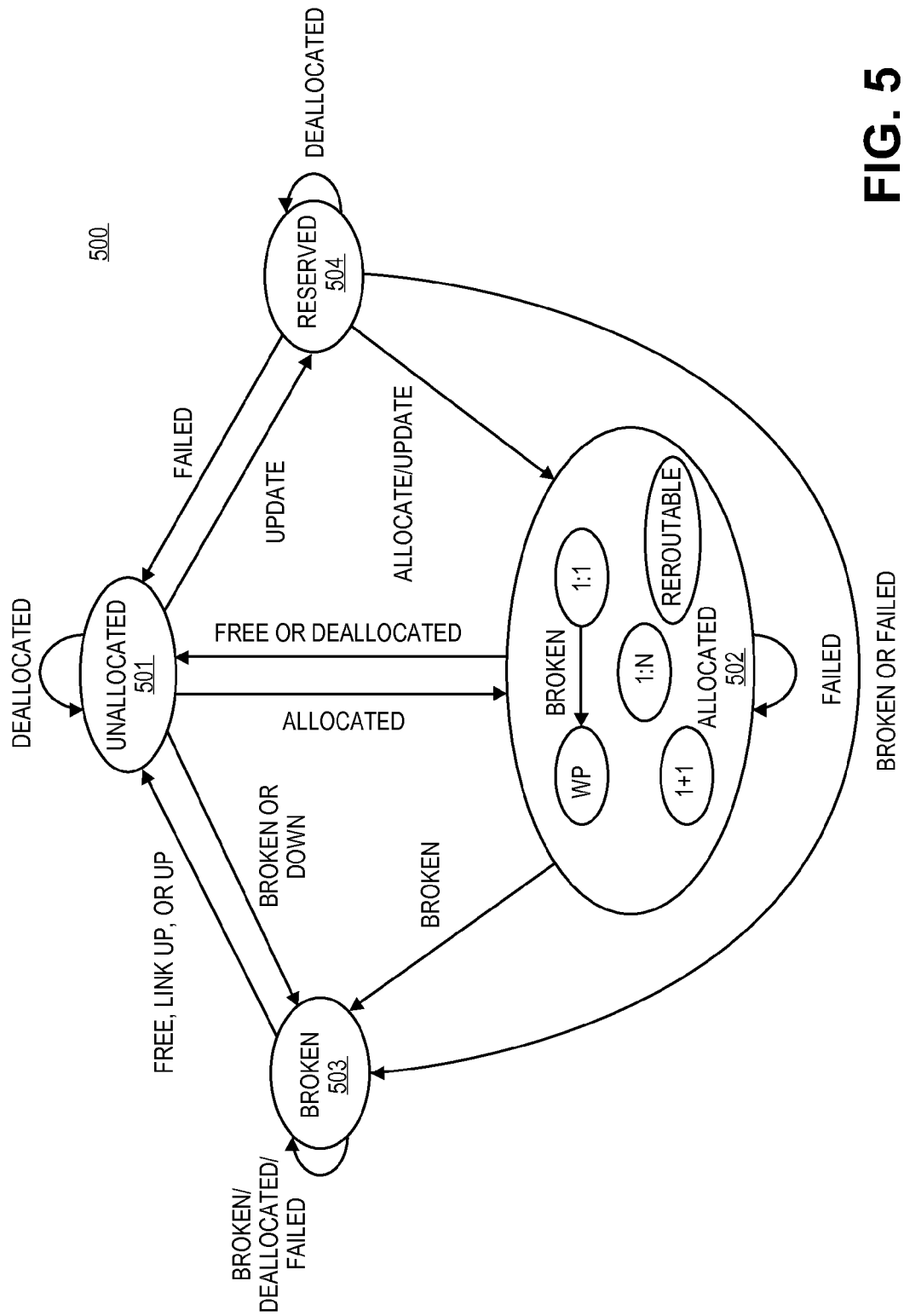
FIG. 5 is a state diagram illustrating an example of operating state machines of channels according to one embodiment of the invention.

FIG. 5 is a state diagram illustrating an example of operating state machines of channels according to one embodiment of the invention. Referring to FIG. 5, in one embodiment, the exemplary state machines 500 include, but not limited to, an unallocated state 501, an allocated state 502, a broken state 503, and a reserved state 504. A channel or path/wavelength combination is in the unallocated state 501 when the corresponding channel has not been allocated to any demand. When a path/wavelength combination is allocated, either as a working path, a protection path, or a reroutable path, the allocated channel is in the allocated state 502. When a path/wavelength combination is broken, either from unallocated state 501, allocated state 502, or reserved state 504, it is in broken state 503. When a path/wavelength combination is allocated, but waiting for a confirmation whether the signaling has been performed successfully, the path/wavelength combination is in the reserved state 504.

According to one embodiment, a path/wavelength combination can transition from one state to another of the states 501-504 dependent upon certain events, which may occur locally within the node or between the nodes in the network. In one embodiment, local events occur at the node when something happens. For example, some local events occur when a link or a channel fails, or alternatively, when a demand is received. According to one embodiment, some of the local events may be defined as follows:

| Events | Descriptions |
| --- | --- |
| Free | The use of the channel is over. For example, the demand has been serviced and the corresponding channel has been released. |
| Update | The signaling confirms whether it was able to use the channel successfully. |
| Up | The channel which was removed due to some problems has come back up. |
| Down | The channel was removed due to some problems to the current node. |

According to one embodiment, the network events are transmitted among some nodes of the network and some of the network events may be defined as follows:

| Events | Descriptions |
| --- | --- |
| Allocate | A channel is being allocated to a demand. |
| Deallocate | The use of the channel is over. |
| Failed | At least one failure occurs while using the channel. |
| Broken | The channel cannot be used since it was removed from one or more nodes of the network due to some problems, either hardware or software problems. |

According to one embodiment, some events may occur both locally and in the network. Some of the local and network events may be defined as follows:

| Events | Descriptions |
| --- | --- |
| Link Down | A link between two nodes is down. As a result, all channels or wavelengths associated with that link are removed or unavailable. |
| Link Up | A link between two nodes is back up. As a result, all channels or wavelengths associated with that link come back up (e.g., recovered). |

It will be appreciated that other events apparent to those with ordinary skill in the art may exist.

Referring to FIGS. 4 and 5, in one embodiment, at unallocated state 501, the channel may have unallocated status 401. At broken state 503, the channel may have broken status 403. At allocated state 502, the channel may have allocated statuses 404-408, either as a working path or a protection path. At reserved state 504, according to one embodiment, the channel may have allocated statuses 404-408 with a reserved indication. Other configurations may exist.

Examples of Processes for Handling a Demand

Figure 6:
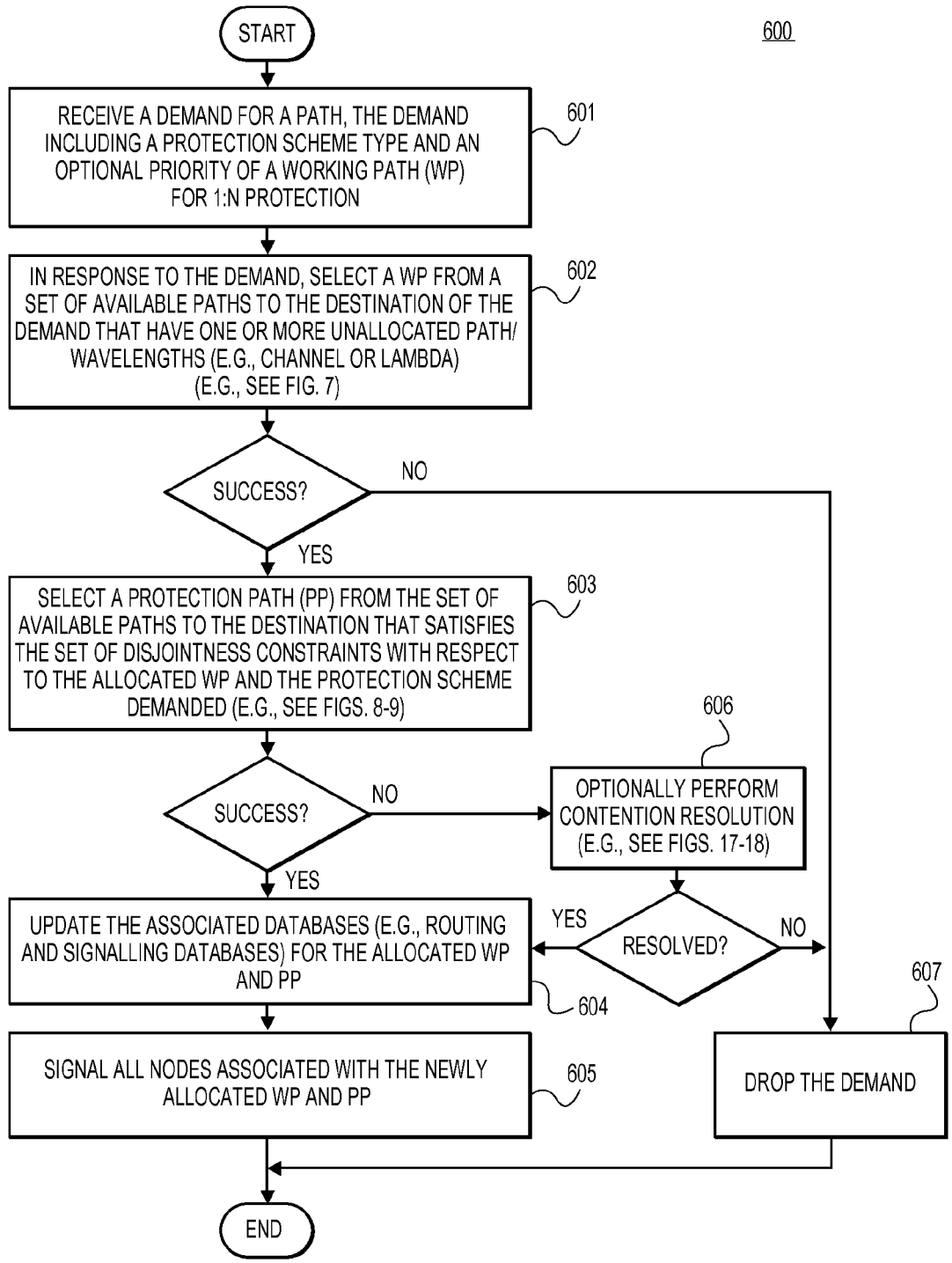
FIG. 6 is a flow diagram illustrating an example of a process for handling a demand in an optical network node, according to one embodiment of the invention.

FIG. 6 is a flow diagram illustrating an example of a process for handling a demand in an optical network node, according to one embodiment of the invention. The exemplary process 600 may be performed by a processing logic that may comprise hardware (circuitry, dedicated logic, etc.), software (such as is run on a dedicated machine), or a combination of both.

Referring to FIG. 6, at block 601, a demand for a path is received at a node, such as, for example, a source node of an optical circuit. In one embodiment, the demand includes a protection scheme, such as, for example, a 1+1, 1:1, 1N or reroutable scheme. If the protection scheme demanded is a 1:N protection scheme, according to one embodiment, the demand may further include a priority of the working path in demand (e.g., to determine which working path gets the 1:N protection path when multiple working failures occur subsequently). In an alternative embodiment or where the demand does not include a priority, the priority of the demand may be assigned by the node based on one or more policies. For example, the priority of the demand may be assigned by the node on a first-come-first-served basis. In this example, the first demand would be assigned with a priority of one and the second demand would receive a priority of two, etc. In another example, priorities may be assigned randomly.

In response to the demand, at block 602, a working path is selected from a set of available paths to the destination in demand that has one or more unallocated channel (e.g., path/wavelength combination). Again, although embodiments of the present application are not limited to WDM optical networks, for the purposes of illustration, a WDM network is used herein to describe the embodiments of the present application. In one embodiment, the selection is based on the destination of the demand. For example, the selection is performed by walking through a database based on the destination, such as, for example, exemplary database 200 shown in FIG. 2A, until an unallocated path that leads to the destination of the demand is located.

Alternatively, according to an alternative embodiment of the invention, the selection may be performed by locating a path that is unallocated based on a database, such as, for example, exemplary database 250 of FIG. 2B. For example, the selection may be performed by walking through the paths shown in field 251 to search for a path that has not been allocated, such as, for example, path 259. Once an unallocated path has been located, it is also checked whether the located path leads to the destination of the demand. If the unallocated path leads to the destination in demand, the unallocated path may be selected as a working path for the demand. If an unallocated path leading to the destination in demand cannot be found, at block 607, the demand may be dropped.

If an unallocated path for the destination in demand is found, at block 603, a protection path is searched from a set of available paths to the destination that satisfies the set of disjointness constraints with respect to the working path selected above. In one embodiment, the search may be conducted based on node disjointness with respect to the working path selected above. Alternatively, the search may be conducted based on a disjointness preference order set up by a network owner or a service provider, such as, for example, in preference database 104 of FIG. 1. Further detailed information concerning selecting a protection path will be described further below.

If a protection path with respect to the working path cannot be found, at block 606, a contention resolution may be performed. During the contention resolution, another path having lower priority protection scheme than the one in demand may be searched and preempted (e.g., bumped). The path preempted is then allocated as a protection path and the working path and the traffic of the preempted path may be rerouted. The exemplary contention resolution will be described in details further below. If the contention resolution cannot be resolved, the demand may be dropped and the already allocated resources (e.g., the allocated working path) may be released.

If a protection path with respect to the working path above is found, the working path and the protection path are allocated to the demand and at block 604, the associated databases, such as, for example, databases shown in FIGS. 2A-2B and 3, may be updated. For example, the status of the working path may be changed from unallocated to allocated/working and the status of the protection path may be changed from unallocated to allocated/protection/1+1, 1:1, or 1:N. At block 605, the nodes of the path are signaled by, for example, signaling module 110 of FIG. 1.

According to one embodiment, while the signaling module performs the signaling, the state of the paths (e.g., working path and protection path) may be in a temporary state, such as reserved state 504 of FIG. 5, from unallocated state 501. Note that during the reserved state, the status of the paths may still be maintained as allocated/working and allocated/protection/1+1, 1:1, or 1:N with a reserved mark or label, which may be implemented as an additional field in the exemplary databases shown in FIGS. 2A-2B and 3 (not shown). Once the signaling has been completed, the paths may be changed from reserved state to permanent state. For example, according to one embodiment, if the signaling is performed successfully, the state of the paths may be changed from reserved state 503 to allocated state 502 via an allocate update event. The reserved label associated with the status of the paths may be removed to indicate that the paths have been allocated permanently. If the signaling has not been performed successfully, the state of the paths may be changed from reserved back to unallocated via a failed event.

If, however, during the reserved state, one of the paths (e.g., working path and protection path) is down, for example, as a result of a fiber cut or the corresponding laser failure, the state of the paths may be changed from reserved state 504 to broken state 503, via a failure event or a broken event. The status of the paths may also be changed. For example, the status of the failed path may be changed from allocated/working or allocated/protection/1+1, 1:1, or 1:N to broken. The exemplary process 600 of FIG. 6 may be performed again for searching for a path that is suitable for replacing the failed path. Other operations may also be performed.

Figure 7:
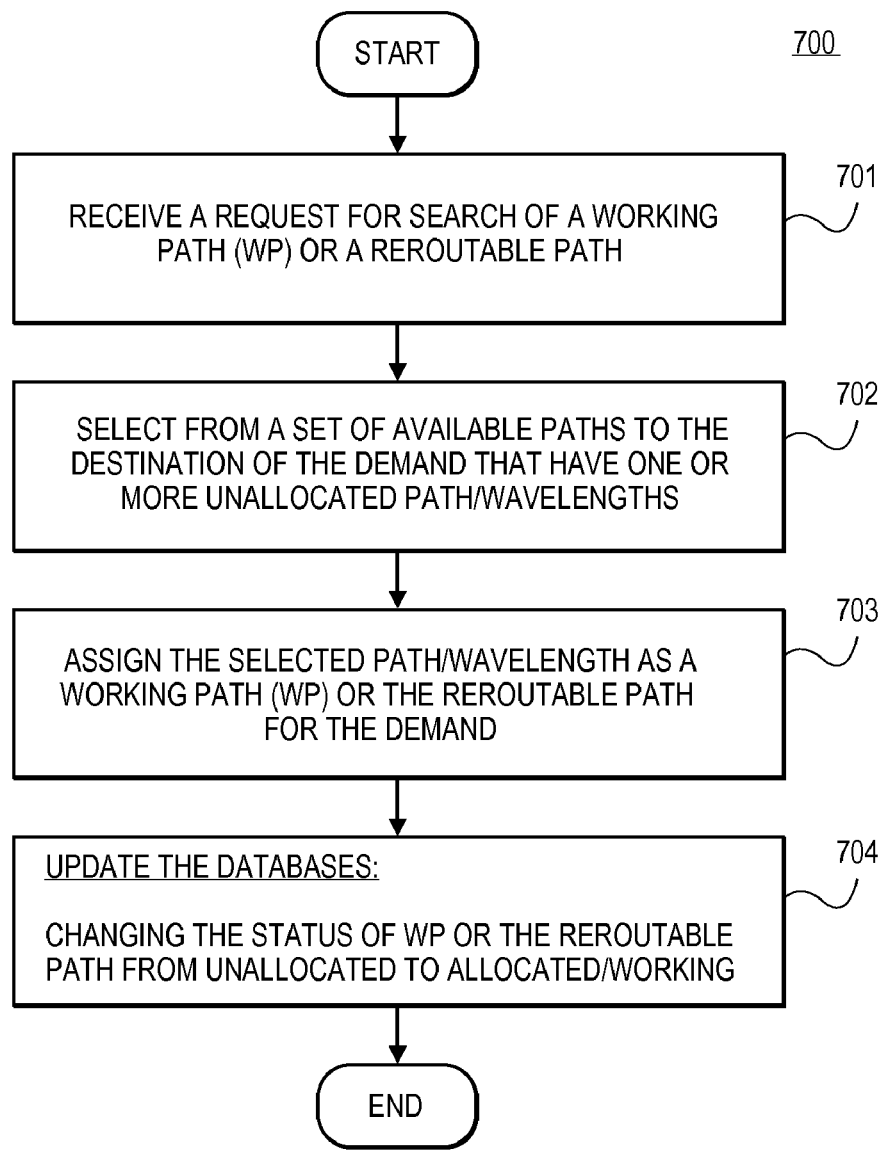
FIG. 7 is a flow diagram illustrating an exemplary process for searching a working path according to one embodiment of the invention.

FIG. 7 is a flow diagram illustrating an exemplary process for searching a working path according to one embodiment of the invention. The exemplary process 700 may be performed by a processing logic that may comprise hardware (circuitry, dedicated logic, etc.), software (such as is run on a dedicated machine), or a combination of both. In one embodiment, exemplary process 700 may be performed as a part of operations in block 602 of FIG. 6. Alternatively, exemplary process 700 may be invoked in response to a demand for a working path or rerouting a working path.

Referring to FIG. 7, in one embodiment, at block 701, a demand for a working path is received. If it is for a 1:N protection scheme, the demand may also include a priority of the working path being searched. At block 702, a path is selected from a set of available paths to the destination in demand that have one or more unallocated path/wavelength combination. The search may be performed based on the exemplary database organization illustrated in FIG. 2A or FIG. 2B as described above. Once the suitable path has been found and selected, at block 703, the selected path is allocated to the demand. At block 704, the associated databases, such as those exemplary databases shown in FIGS. 2A-2B and 3 may be updated with respect to the allocated working path. For example, the status of the newly allocated path may be changed from unallocated to allocated/working. In one embodiment, the operations of block 704 may be a part of operations of block 604 of FIG. 6. Other operations apparent to those with ordinary skill in the art may also be performed.

Figure 8:
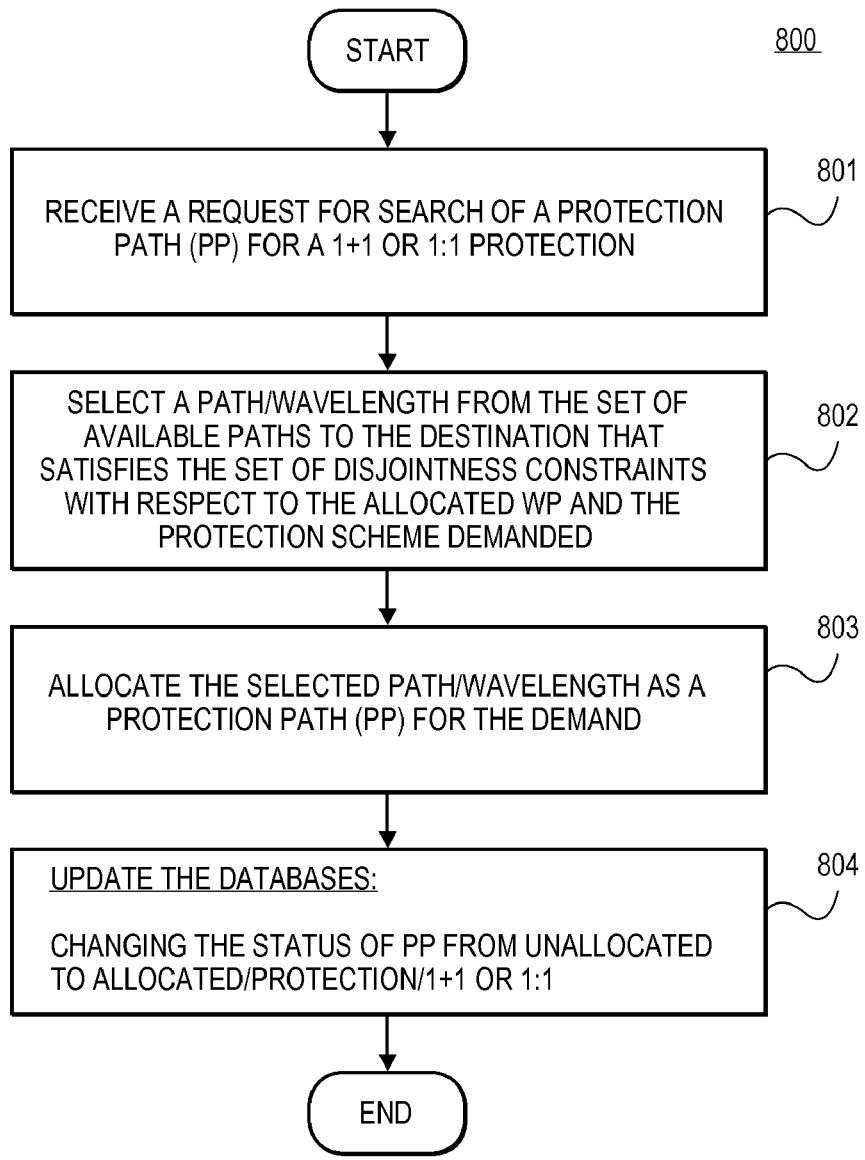
FIG. 8 is a flow diagram illustrating an exemplary process for searching a 1+1 or 1:1 protection path according to one embodiment of the invention.

FIG. 8 is a flow diagram illustrating an exemplary process for searching a 1+1 or 1:1 protection path according to one embodiment of the invention. The exemplary process 800 may be performed by a processing logic that may comprise hardware (circuitry, dedicated logic, etc.), software (such as is run on a dedicated machine), or a combination of both. The exemplary process 800 may be performed as a part of the operations involved at block 603 of FIG. 6. Alternatively, exemplary process 800 may be invoked in response to a demand for a 1+1 or 1:1 protection path or rerouting a 1+1 or 1:1 protection path.

Referring to FIG. 8, according to one embodiment, at block 801, a demand for searching a protection path is received. The demand may include a protection scheme type (e.g., 1+1 or 1:1). In response to the demand, at block 802, a path (e.g., path/wavelength combination) is selected from a set of available paths to the destination that satisfies the set of disjointness constraints with respect to the associated allocated working path and the protection scheme in demand. In one embodiment, the search may be performed based on a disjointness preference order specified by a network owner or a service provider, which may be stored in the exemplary preference database 104 of FIG. 1. The search may be performed based on the databases organizations as shown in FIGS. 2A-2B and 3 as described above.

Once a suitable protection path is found and selected, the selected path is then allocated to the demand at block 803. At block 804, the associated databases, such as, for example, the exemplary databases shown in FIGS. 1, 2A-2B, and 3, may be updated with respect to the newly allocated protection path. For example, the status of the newly allocated protection path may be updated from unallocated to allocated/protection/1+1 or 1:1. In one embodiment, the operations of block 804 may be a part of operations of block 604 of FIG. 6. Other operations apparent to those with ordinary skill in the art may be performed.

Figure 9:
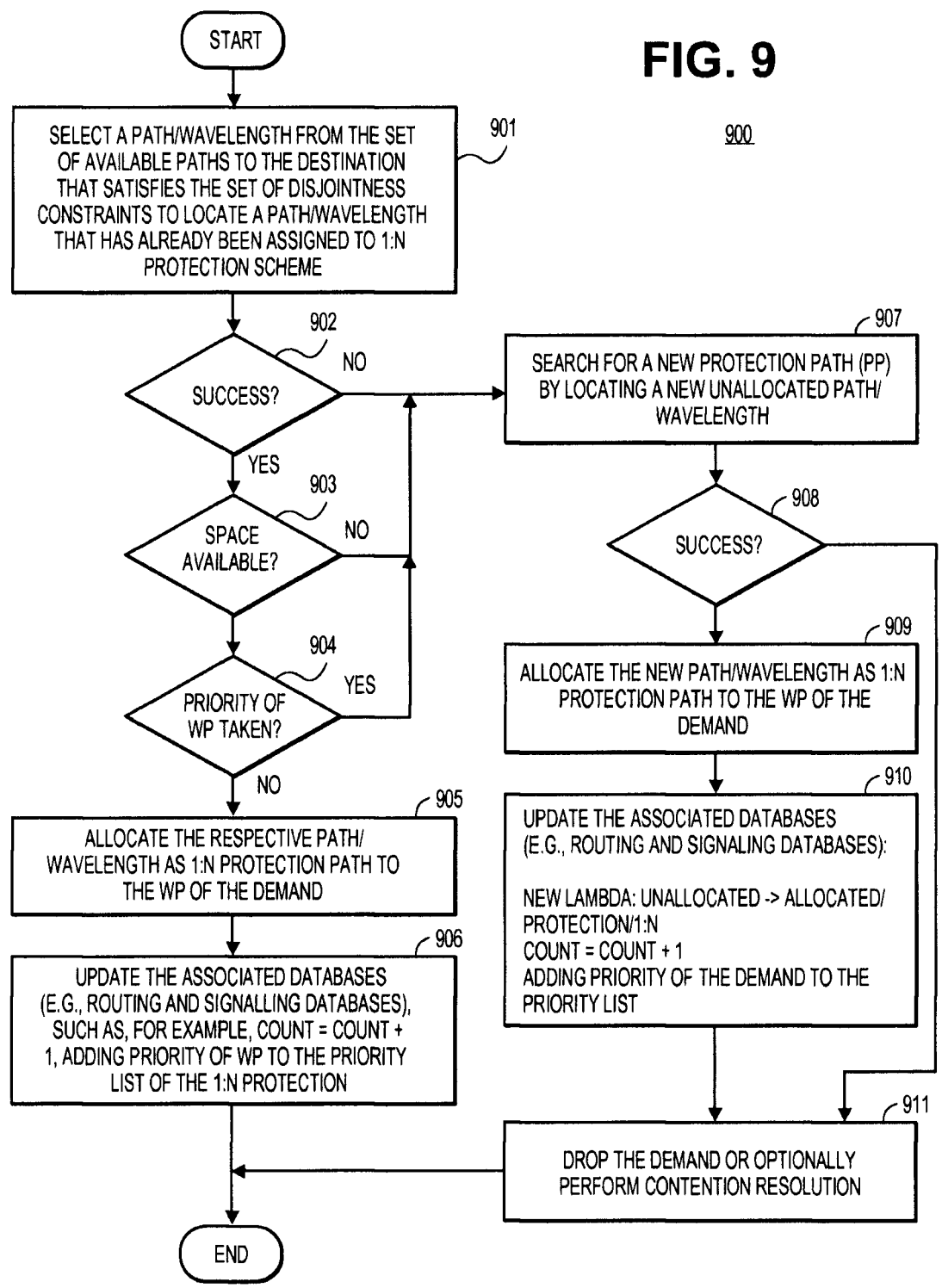
FIG. 9 is a flow diagram illustrating an exemplary process for searching a 1:N protection path according to one embodiment of the invention.

FIG. 9 is a flow diagram illustrating an exemplary process for searching a 1:N protection path according to one embodiment of the invention. The exemplary process 900 may be performed by a processing logic that may comprise hardware (circuitry, dedicated logic, etc.), software (such as is run on a dedicated machine), or a combination of both. The exemplary process 900 may be performed as a part of the operations involved at block 603 of FIG. 6. Alternatively, exemplary process 900 may be invoked in response to a demand for a 1:N protection path or rerouting a 1:N protection path.

Referring to FIG. 9, in response to a demand for a 1:N protection path, at block 901, a path (e.g., path/wavelength combination) is selected from a set of available paths leading to the destination in demand that satisfies the set of disjointness constraints and has already been allocated as a 1:N protection path for other demands or working paths. In one embodiment, the search may be performed based on a disjointness preference order specified by a network owner or a service provider, which may be stored in the exemplary preference database 104 of FIG. 1. The search may be performed based on the databases organizations as shown in FIGS. 2A-2B and 3 as described above.

At block 902, it is determined whether the search is performed successfully. If the search is performed successfully, at block 903, it is determined whether the located 1:N protection path has any space for an additional working path. As described above, each 1:N protection path may be shared by up to a maximum number of working paths, which may be specified by a network owner or service provider in the preference database, such as database 104 of FIG. 1. In addition, some databases, such as connectivity/routing database 105 and signaling database 106, may store information regarding how many working paths currently sharing a specific 1:N protection path, as illustrated in FIGS. 2A-2B and 3 and described above. For example, referring to FIGS. 2B and 9, the count of the 1:N protection, which may be stored in field 254 of FIG. 2B, may be examined whether it is greater than or equals to the maximum limit of 1:N protection which may be stored in the preference database 104 of FIG. 1.

If there is more space available (e.g., the count of 1:N protection of the existing 1:N protection path has not reached the maximum limit specified by the network owner or the service provider in preference database 104 of FIG. 1), at block 904, it is determined whether the priority of the working path associated with the 1:N protection path in demand has been taken. As described above, no more than one working path having the same priority is allowed in the same 1:N protection scheme. The priorities of the working paths currently sharing the 1:N protection path, which may be stored in field 256 of FIG. 2B, may be used to examine whether the priority of the working path in demand has been included in the instant 1:N protection path.

If the priority of the working path in demand has not been taken, at block 905, the instant 1:N protection path is then allocated as a 1:N protection path for the working path in demand. At block 906, the associated databases, such as those shown in FIGS. 1, 2A-2B, and 3, may be updated with respect to the newly allocated 1:N protection path. For example, the status of the 1:N protection path remains unchanged (e.g., allocated/protection/1:N) since the protection path has been allocated to other working paths prior to the current working path in demand. However, since the protection path includes an additional working path in demand, the count of the 1:N protection, for example, stored in field 254 of FIG. 2B, may be updated as count=count+1. In addition, the priority of the working path in demand may be added to the priorities of the working paths currently sharing with the 1:N protection path, such as, for example, field 256 of FIG. 2B.

If an existing 1:N protection path has not been found, or if the existing 1:N protection path does not have space, or if the existing 1:N protection path already includes the priority of the working path in demand, at block 907, a new 1:N protection path is searched. In one embodiment, the search may be performed by locating an unallocated path that satisfies the disjointness constraints with respect to the working path in demand. At block 908, it is determined whether the search has been conducted successfully.

If the new protection path has been found successfully, at block 909, the newly found 1:N protection path is allocated to the demand. At block 910, the associated databases, such as those shown in FIGS. 1, 2A-2B, and 3, may be updated for the new allocation. For example, the status of the newly allocated 1:N protection path may be updated from unallocated to allocated/protection/1:N. In addition, the count of the 1:N protection associated with the newly allocated 1:N protection path may be updated as count=count+1, which may be stored in field 254 of FIG. 2B. Furthermore, the priority of the working path associated with he newly allocated 1:N protection path may be added to the priorities of the working paths currently sharing the 1:N protection path, which may be stored in field 256 of FIG. 2B.

If it is determined that the new 1:N protection path has not been allocated successfully (at block 908), at block 911, the demand may be dropped. Alternatively, according to one embodiment, a contention resolution may be performed. The contention resolution will be described further in detail below, for example, in FIGS. 17 and 18 and their respective descriptions. In one embodiment, the operations of blocks 906 and 910 may be a part of operations in block 604 of FIG. 6. Other operations apparent to those with ordinary skill in the art may also be performed.

Exemplary Processes for Handling Path Failures

Once the paths including the working path and the protection paths have been set up and the nodes of the paths are signaled, the paths are up and running and the network traffic will be carried through these paths. According to one embodiment, if there is path failure, either in a working path or a protection path, the traffic of the failed path will be switched to another path that leads to the same destination of the failed path. In addition, a new path may optionally be allocated. In one embodiment, these processes may be performed dynamically without involving a network administrator.

FIG. 10 is a flow diagram illustrating an exemplary process for handling path failures according to one embodiment of the invention. The exemplary process 1000 may be performed by a processing logic that may comprise hardware (circuitry, dedicated logic, etc.), software (such as is run on a dedicated machine), or a combination of both. Referring to FIG. 10, at block 1001, a notification for a path failure is received. The path failure may be detected and the notification of the failure may be received in a variety of manners. According to one embodiment, the failure of a path may be detected based on a loss of optical signal, such as, for example, a loss of light of a path/wavelength combination. A terminating node of the corresponding optical circuit, such as, for example, the source or the destination node of the optical circuit, may also be notified regarding the path failure based on a loss of the optical signal (e.g., loss of light) on a path/wavelength associated with the failed path/wavelength combination.

Referring back to FIG. 10, in response to the notification of a path failure, at block 1002, it is determined what paths are affected as a result of the failure based on the information stored in the databases, such as, for example, the exemplary databases shown in FIGS. 1, 2A-2B, and 3. For example, the determination may be performed based on the information stored in the exemplary database 300 of FIG. 3 by walking through fields 301 and 302. At block 1003, it is determined whether the failed path is a working path.

If the failed path is a working path, at block 1004, it is determined what protection scheme is associated with the failed working path (e.g., 1+1, 1:1, 1:N, or reroutable). In one embodiment, the protection scheme of the failed working path may be determined based on the information stored in the exemplary databases shown in FIGS. 2B and 3. For example, based on the information stored in the exemplary database 300 of FIG. 3, a protection path associated with the failed working path may be determined. The protection scheme of the protection path associated with the failed working path may be determined based on the information stored in the exemplary database 250 of FIG. 2B.

At block 1005, it is determined whether the protection scheme of the failed working path is a 1:N protection scheme. If the protection scheme of the failed working path is a 1:N protection scheme, at block 1006, a process for handling a failure of a working path having a 1:N protection is performed, which will be described in details further below, such as, for example, in FIG. 11 and its corresponding descriptions. Otherwise, if the protection scheme is not a 1:N protection (e.g., 1+1, 1:1, or reroutable), at block 1010, a process for handling a failure of a working path having a protection other than a 1:N protection is performed, which will be described in details further below, such as, for example, in FIGS. 13 and 14, and their corresponding descriptions.

If the failed path is not a working path, at block 1007, it is determined whether the failed path is a protection path. If the failed path is not a protection path (e.g., an unallocated path), at block 1011, the failed path is marked broken and its status is updated from unallocated to broken.

If the failed path is determined to be a protection path (block 1007), at block 1008, it is determined whether the failed protection path is a 1:N protection path. If the failed protection path is not a 1:N protection path, at block 1010, a process for handling a failure of a protection path having a protection other than a 1:N protection is performed. If the failed protection path is a 1:N protection path, at block 1009, a process for handling a failure of a 1:N protection path is performed, which will be described further in detail below. Other operations apparent to those with ordinary skill in the art may be performed.

Figure 11:
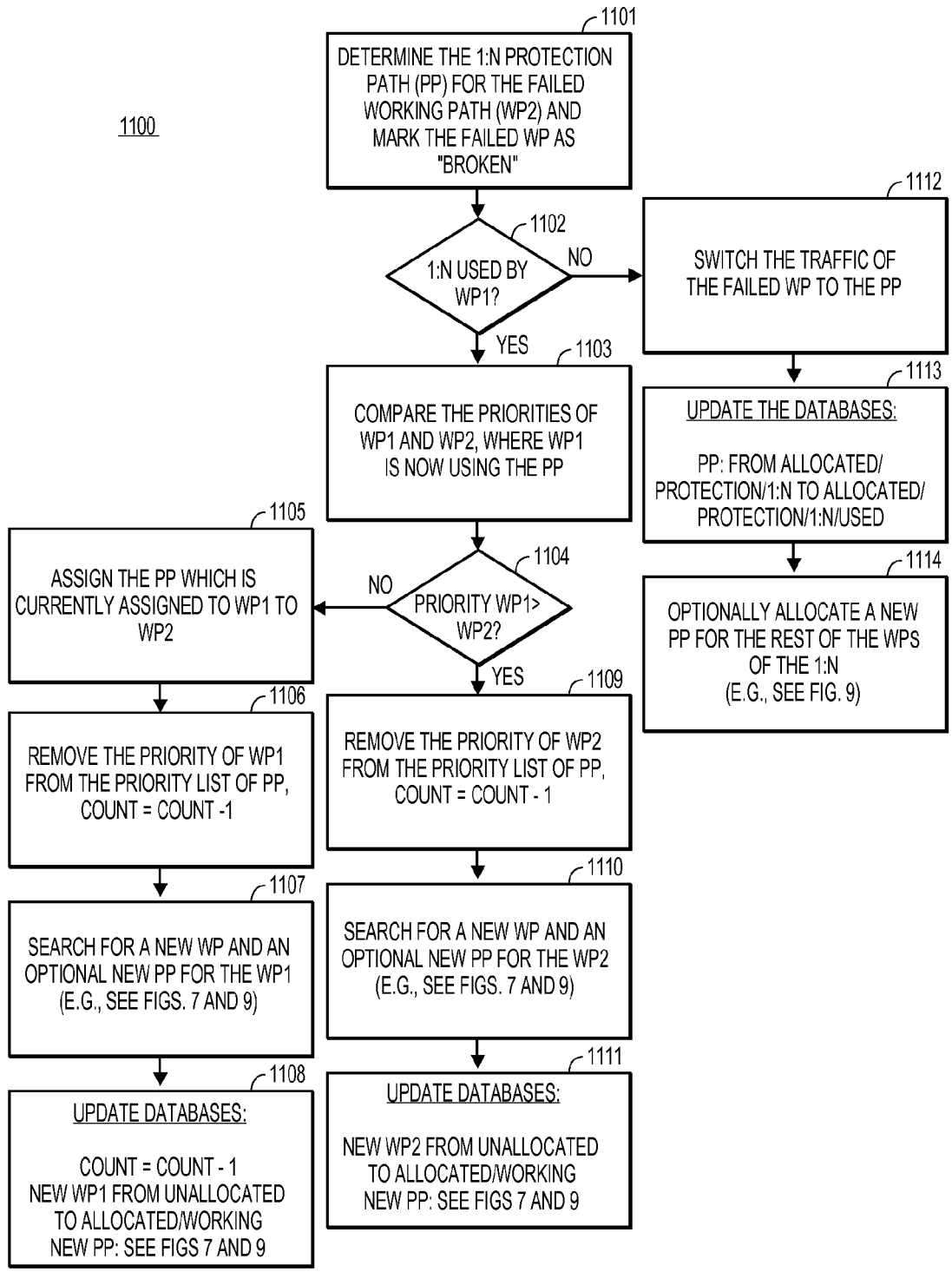
FIG. 11 is a flow diagram illustrating an exemplary process for handling a failure of a working path having a 1:N protection according to one embodiment of the invention.

FIG. 11 is a flow diagram illustrating an exemplary process for handling a failure of a working path having a 1:N protection according to one embodiment of the invention. The exemplary process 1100 may be performed by a processing logic that may comprise hardware (circuitry, dedicated logic, etc.), software (such as is run on a dedicated machine), or a combination of both. In one embodiment, the exemplary process 1100 may be implemented as a part of operations involved in block 1006 of FIG. 10.

Referring to FIG. 11, according to one embodiment, in response to a notification that a working path having a 1:N protection fails, at block 1101, the 1:N protection path associated with the failed working path (hereinafter referred to as working path 2 or WP2) is determined and the status of the failed working path (e.g., WP2) is updated from allocated/working to broken.

At block 1102, it is determined whether the 1:N protection path associated with WP2 is being used by another working path (hereinafter referred to as WP1). It is assumed that WP1 fails before WP2 and the traffic of WP1 has been switched to the 1:N protection path shared by WP1 and WP2, optionally as well as some other working paths.

If the 1:N protection path is being used by another working path WP1, at block 1103, the priorities of WP1 and WP2 are compared against each other (block 1104). If the priority of WP1 is lower than the priority of WP2, at block 1105, the 1:N protection path (currently used by the traffic of WP1) is assigned to WP2 and the traffic of WP2 is switched over to the 1:N protection path.

At block 1106, a new working path is allocated for the traffic of WP1, which previously handled by the 1:N protection path. In one embodiment, the working path may be allocated using the exemplary process 700 of FIG. 7. The traffic of WP1 is then switched over to the newly allocated working path. At block 1107, a new 1:N protection path may be optionally allocated for the new working path carrying the traffic of WP1. In one embodiment, the new protection path allocated for WP1 may be allocated using the exemplary process 900 of FIG. 9.

Thereafter, at block 1108, the associated databases, such as those shown in FIGS. 1, 2A-2B, and 3, are updated. For example, the status of the new WP1 is updated from unallocated to allocated/working and the new protection path for the new WP1 is updated dependent upon whether the new protection path for the WP1 is a previously unallocated path or an existing 1:N protection path, as described in FIG. 9. In addition, since a new working path and a protection path have been allocated for the original WP1, the protection path for the original WP1 (now used by the traffic of WP2) no longer serves as a 1:N protection path for WP1. As a result, the count of the 1:N protection path (e.g., field 254 of FIG. 2B) may be updated as count=count−1. Furthermore, the priority of WP1 may be removed from the priorities of the working paths currently sharing with the 1:N protection (e.g., field 256 of FIG. 2B).

Further, according to one embodiment of the invention, after assigning the protection path to WP2 performed at lock 1105 and before allocating a new working path for WP1, the original failed WP1 (which may be marked as broken) is checked whether the original failed WP1 has recovered. If the original failed WP1 has recovered, the traffic of the current WP1 may be switched back to the recovered WP1. In that case, the status of the recovered WP1 may be updated from broken to allocated/working again. Other configurations may exist.

Referring back to FIG. 11, if it is determined, at block 1104, that the priority of WP1 is higher than the priority of WP2, at block 1109, the priority of WP2 is removed from the priorities of the working paths currently sharing with the 1:N protection path (e.g., field 256 of FIG. 2B), because a new path is needed for the traffic of WP2 and it is no longer under the protection of the 1:N protection path.

At block 1110, a new working path is searched and allocated for the WP2 using, for example, the exemplary process 700 of FIG. 7. In addition, a new protection path is optionally searched and allocated to the new WP2 using, for example, the exemplary process 900 of FIG. 9.

At block 1111, the associated databases, such as, for example, those shown in FIGS. 1, 2A-2B, and 3, are updated. For example, the status of the new WP2 is updated from unallocated to allocated/working and the status of the new protection path may vary as described in FIG. 9 and its corresponding descriptions.

Referring to FIG. 11, if it is determined, at block 1102, that the 1:N protection path is not being used, at block 1112, the 1:N protection path is assigned to WP2 and the traffic of WP2 is switched over to the 1:N protection path. At block 1113, the associated databases, such as those exemplary databases shown in FIGS. 1, 2A-2B, and 3, are updated. For example, the status of the protection path is updated from allocated/protection/1:N to allocated/protection/1:N/used. Optionally, a new 1:N protection path may be searched and allocated for the rest of the working paths in the 1:N protection scheme using, for example, the exemplary process 900 of FIG. 9. Other operations apparent to those with ordinary skill in the art may be performed.

Figure 12:
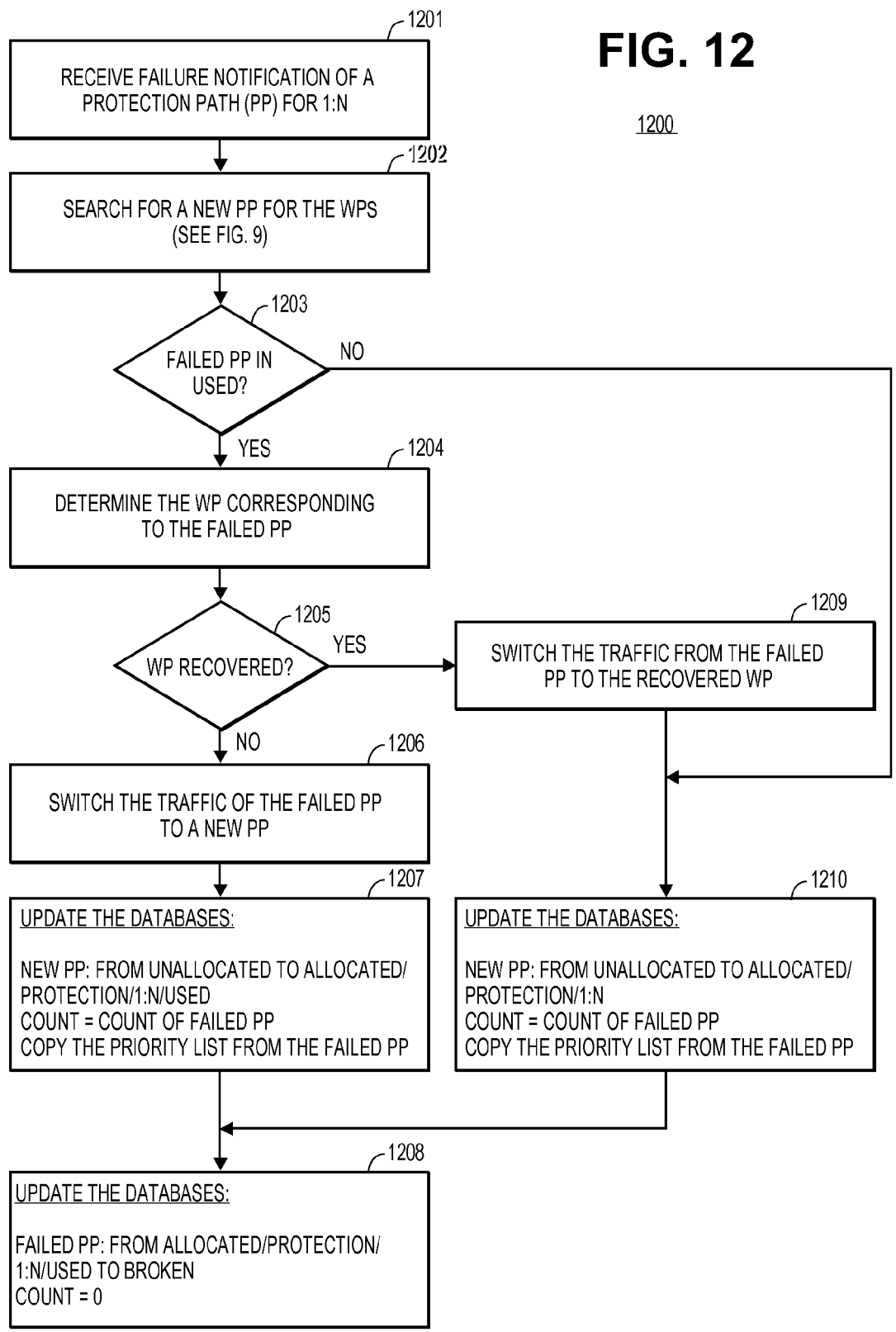
FIG. 12 is a flow diagram illustrating an exemplary process for handling a failure of a 1:N protection path according to one embodiment of the invention.

FIG. 12 is a flow diagram illustrating an exemplary process for handling a failure of a 1:N protection path according to one embodiment of the invention. The exemplary process 1200 may be performed by a processing logic that may comprise hardware (circuitry, dedicated logic, etc.), software (such as is run on a dedicated machine), or a combination of both. In one embodiment, the exemplary process 1200 may be implemented as a part of operations involved in block 1009 of FIG. 10.

Referring to FIG. 12, at block 1201, a fault notification of a 1:N protection path is received. In one embodiment, the fault notification may be received by not receiving a light of a path/wavelength combination as an indication that the path/wavelength is down. At block 1202, a new 1:N protection path s searched and allocated, replacing the protection path at fault. In one embodiment, the new 1:N protection path may be searched and allocated using at least a part of the exemplary process 900 of FIG. 9. At block 1203, it is determined whether the failed protection path was being used prior to the failure, for example, by a failed working path.

If it is determined that the failed protection path was being used prior to the failure, at block 1204, a working path which was using the failed protection path is determined. At block 1205, according to one embodiment, it is determined whether the working path using the protection path has recovered from the failure.

If it is determined that the working path has not recovered, at block 1206, the traffic of the failed protection path may be switched over to the new 1:N protection path (allocated at block 1202). At block 1207, the associated databases, such as, for example, those shown in FIGS. 1, 2A-2B, and 3, may be updated. For example, the status of the newly allocated 1:N protection path is updated from unallocated to allocated/protection/1:N/used; count=count of the failed protection path; and the priorities of the working paths currently sharing the protection path are copied from the failed protection path to the new protection path. In addition, at block 1208, the status of the failed protection path may be updated from allocated/protection/1:N/used to broken and the count of the failed protection path is reset to zero, since no working path is under the protection of the failed protection path any more.

If it is determined, at block 1205, that the failed working path has recovered, at block 1209, according to one embodiment, the traffic of the failed protection path may be switched back to the recovered working path. At block 1210, the associated databases, such as, for example, those shown in FIGS. 1, 2A-2B, and 3, may be updated. For example, the status of the new protection path may be updated from unallocated to allocated/protection/1:N/used. The count of the failed 1:N protection path may be copied to the new 1:N protection path. The priorities of the working path sharing the 1:N protection path are copied to the new 1:N protection path. The status of the failed protection path may be updated from allocated/protection/1:N/used to broken and its count is reset to zero.

If it is determined, at block 1203, that the failed protection path is not being used, at block 1210, the associated databases, such as, for example, those shown in FIGS. 1, 2A-2B, and 3, may be updated. For example, the status of the new protection path may be updated from unallocated to allocated/protection/1:N/used. The count of the failed 1:N protection path may be copied to the new 1:N protection path. The priorities of the working path sharing the 1:N protection path are copied to the new 1:N protection path. The status of the failed protection path may be updated from allocated/protection/1:N/used to broken and its count is reset to zero.

According to an alternative embodiment, any recovered path may be released back to the unallocated pool. That is, when a working path is broken, after the traffic of the broken working path has been switched over to the protection path, a new working path is searched and allocated to replace the broken working path. Subsequently, when the broken working path recovers, the recovered working path may be released back to the unallocated pool (e.g., from broken state 503 back to unallocated state 501 of FIG. 5) and the status of the recovered working path is updated from broken to unallocated. In addition, when the protection path fails, the traffic of the protection path may be switched over to the new working path and the associated databases may be updated accordingly. Alternatively, while the protection path is carrying the traffic of the failed working path, once the new working path is searched and allocated successfully, the traffic of the protection path may be switched over to the new working path immediately and the protection path becomes available (e.g., the status of the protection path is updated from allocated/protection/1:N/used to allocated/protection/1:N). Other configurations apparent to those with ordinary skill in the art may exist.

Figure 13:
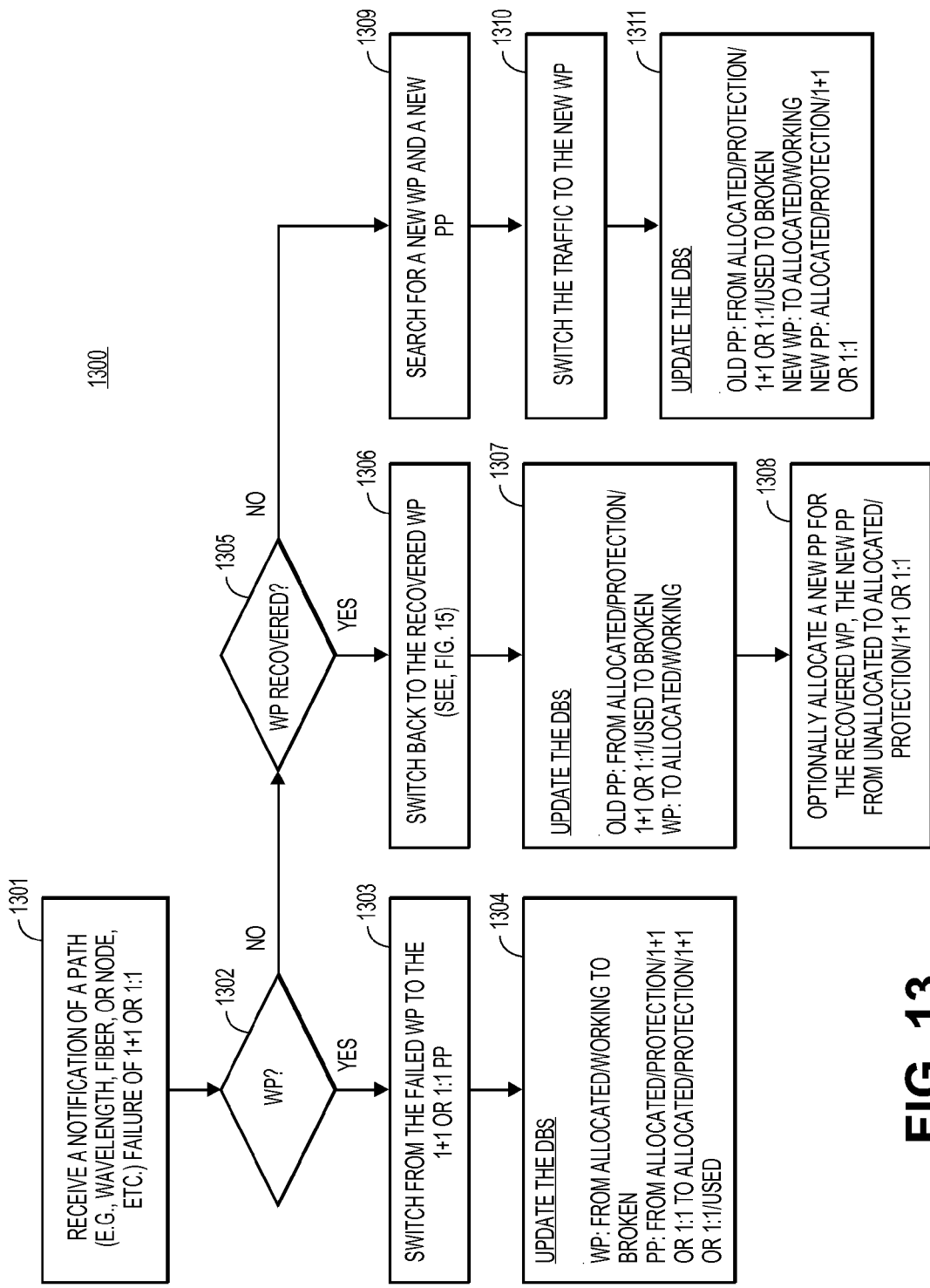
FIG. 13 is a flow diagram of an exemplary process for handling a path failure having a 1+1 or 1:1 protection scheme according to one embodiment of the invention.

FIG. 13 is a flow diagram of an exemplary process for handling a path failure having a 1+1 or 1:1 protection scheme according to one embodiment of the invention. The exemplary process 1300 may be performed by a processing logic that may comprise hardware (circuitry, dedicated logic, etc.), software (such as is run on a dedicated machine), or a combination of both. In one embodiment, the exemplary process 1300 may be implemented as a part of operations involved in block 1010 of FIG. 10.

Referring to FIG. 13, at block 1301, a fault notification of a path having a 1+1 or 1:1 protection scheme is received. The failed path may be a working path or a protection path of a 1+1 or 1:1 protection scheme. At block 1302, it is determined whether the failed path is a working path. If the failed path is a working path, at block 1303, the traffic of the failed working path is switched to the protection path if the protection scheme is a 1:1 protection scheme. In the case of 1+1 protection scheme, the destination node is notified that the traffic is coming from the 1+1 protection path. Thereafter, at block 1304, the associated databases, such as, for example, those shown in FIGS. 1, 2A-2B, and 3, are updated. For example, the status of the failed working path is updated from allocated/working to broken. In the case of 1:1 protection scheme, the status of the protection path is updated from allocated/protection/1:1 to allocated/protection/1:1/used.

If it is determined, at block 1302, that the failed path is not a working path (e.g., the failed path is a protection path), at block 1305, it is determined whether the original working path, which traffic is using the failed protection path, has recovered. If the original working path has recovered, at block 1306, the traffic of the failed protection path is switched back to the original working path. In one embodiment, the processes for handling a recovery of a path may be performed using the exemplary process 1500 of FIG. 15, which will be described in details further below.

Thereafter, at block 1307, the associated databases, such as, for example, those shown in FIGS. 1, 2A-2B, and 3, may be updated. For example, the status of the failed protection path is updated from allocated/protection/1+1 or 1:1 to broken and the status of the original working path is updated to allocated/working. Optionally, a new protection path may be allocated for the recovered working path, using, for example, the exemplary process 800 of FIG. 8.

If it is determined, at block 1305, that the original working path has not recovered, at block 1309, a new working path and a new protection path may be searched and allocated. At block 1310, the traffic of the failed protection path is switched to the new working path. At block 1311, the associated databases is updated. For example, the status of the failed protection path is updated from allocated/protection/1+1 or 1:1 to broken. The status of the new working path is updated from unallocated to allocated/working and the status of the new protection path is updated from unallocated to allocated/protection/1+1 or 1:1. Other operations apparent to those with ordinary skill in the art may be performed.

According to another embodiment, when a broken working path recovers, the recovered working path may be released back to the unallocated pool (e.g., from broken state to unallocated state as shown in FIG. 5). In this embodiment, the operations of blocks 1305-1308 may be skipped and a new working path is always searched and allocated as performed in blocks 1309-1311.

According to a further embodiment, when a failed working path recovers, the traffic of a protection path carrying for the then failed working path and now recovered working path may be switched back to the recovered working path without waiting for the failure of the protection path. The protection path is then released (e.g., not being used). The status of the recovered working path may be updated from broken to allocated/working and the status of the protection path may be updated from allocated/protection/1+1 or 1:1/used to allocated/protection/1+1 or 1:1.

Figure 14:
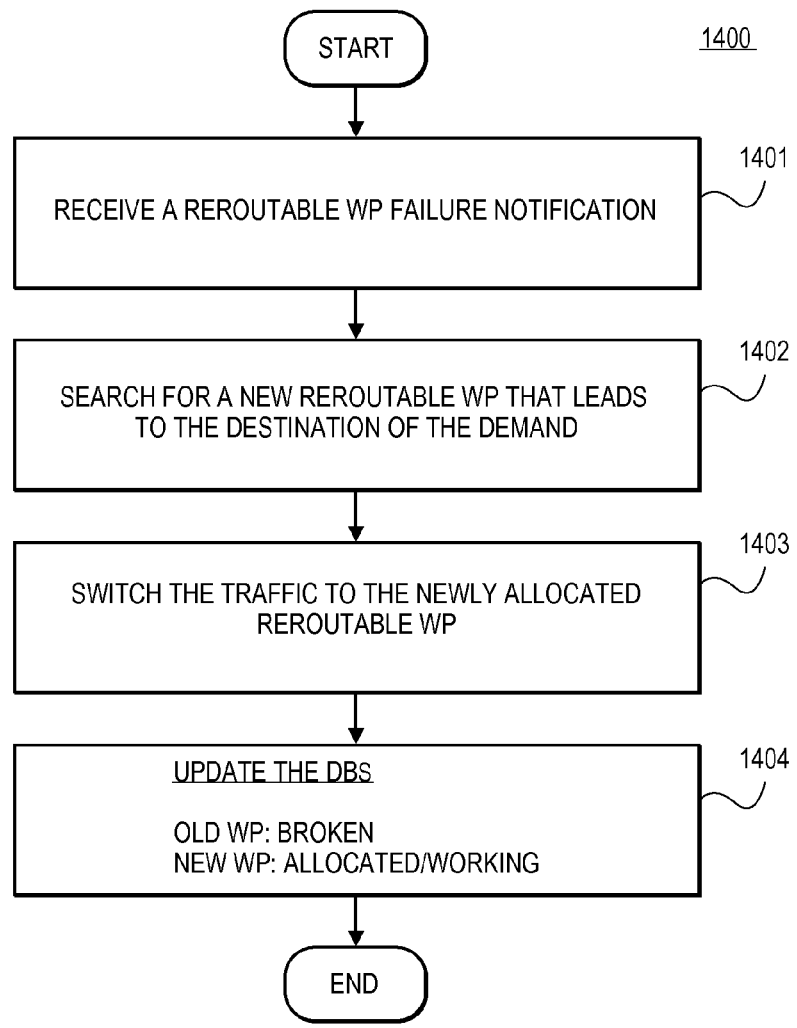
FIG. 14 is a flow diagram illustrating an exemplary process for handling a failure of a reroutable path according to one embodiment of the invention.

FIG. 14 is a flow diagram illustrating an exemplary process for handling a failure of a reroutable path according to one embodiment of the invention. The exemplary process 1400 may be performed by a processing logic that may comprise hardware (circuitry, dedicated logic, etc.), software (such as is run on a dedicated machine), or a combination of both. In one embodiment, the exemplary process 1400 may be implemented as a part of operations involved in block 1010 of FIG. 10.

Referring to FIG. 14, at block 1401, a fault notification of a reroutable path is received. At block 1402, a new reroutable path is searched and allocated from a set of available paths that lead to the destination of the failed reroutable path and have one or more unallocated channels (e.g., path/wavelength combination). In one embodiment, the search may be conducted using the exemplary database organization shown in FIGS. 2A and 2B. If a new reroutable path cannot be located, the demand is dropped.

If a new reroutable path is found, at block 1403, the traffic of the failed path is switched over to the new reroutable path. At block 1404, the associated databases, such as, for example, those shown in FIGS. 1, 2A-2B, and 3, are updated. For example, the status of the failed reroutable path is updated from allocated/working to broken and the status of the new reroutable path may be updated from unallocated to allocated/working. Other operations apparent to those with ordinary skill in the art may also be performed.

Figure 15:
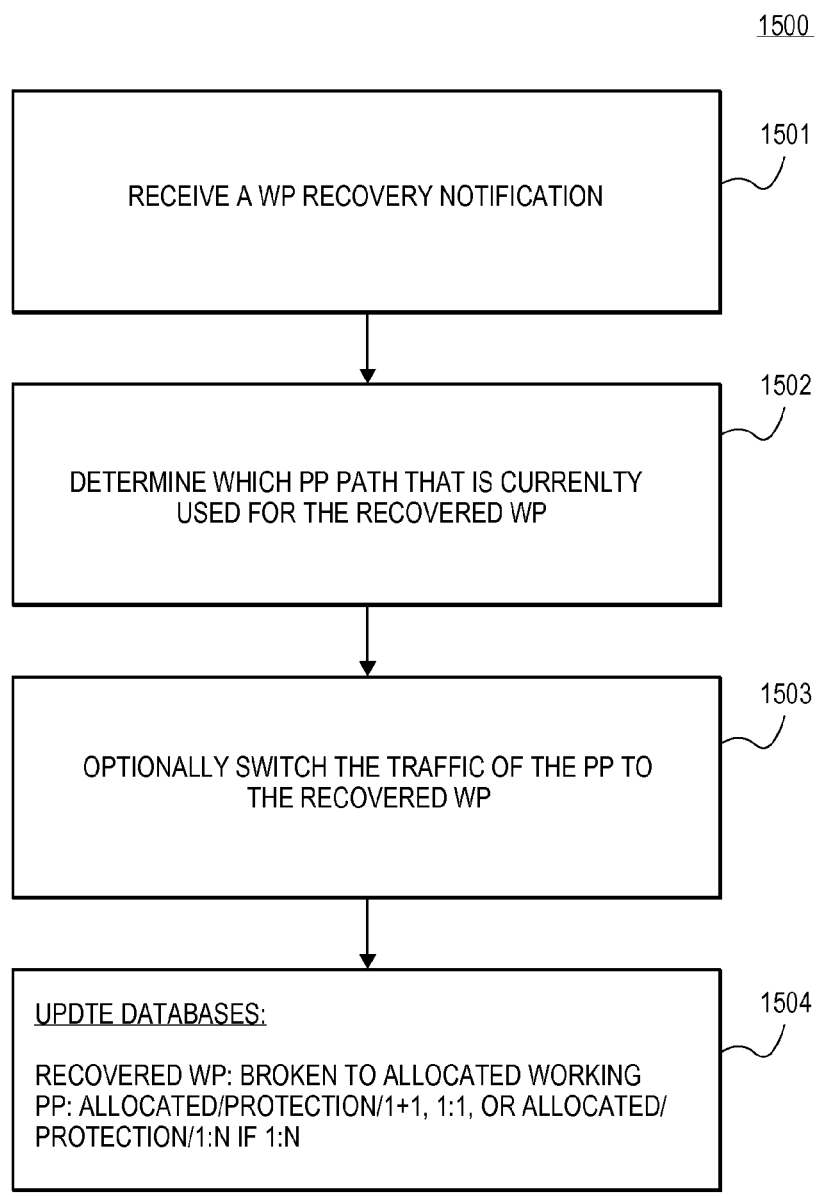
FIG. 15 is a flow diagram illustrating an exemplary process for handling a recovery of a working path according to one embodiment of the invention.

FIG. 15 is a flow diagram illustrating an exemplary process for handling a recovery of a working path according to one embodiment of the invention. The exemplary process 1500 may be performed by a processing logic that may comprise hardware (circuitry, dedicated logic, etc.), software (such as is run on a dedicated machine), or a combination of both.

Referring to FIG. 15, at block 1501, a notification of a working path recovery is received. In response to the notification, at block 1502, a protection path currently carrying the traffic of the previously failed, now recovered working path is determined. In one embodiment, the determination is performed based on the information stored in the exemplary databases shown in FIGS. 2A-2B and 3. At block 1503, the traffic of the protection path currently may be switched back to the recovered working path. At block 1504, the associated databases, such as, for example, those shown in FIGS. 1, 2A-2B, and 3, may be updated. For example, the status of the recovered working path may be updated from broken to allocated/working and the status of the protection path may be updated from allocated/protection/1+1, 1:1, or 1:N/used to allocated/protection/1+1, 1:1, or 1:N.

In another embodiment, the traffic would not be switched from the protection path back to the recovered working path until the protection path fails. In a further embodiment, when a working path recovers, the working path may be released back to the unallocated pool (e.g., the status or state transitions from broken to unallocated).

Exemplary Contention Resolution Embodiments

When protection path is searched, typically, according to one embodiment, a fully node disjoint path with respect to a working path is searched and allocated. However, there are some cases that a protection path that satisfies the disjointness constraints with respect to a working path cannot be found. In this case, an optional contention resolution may be performed. During a contention resolution, another protection path may be preempted or dumped, if the protection scheme of the instance search has a higher priority than an existing protection path. In one embodiment, the priority order of the protection scheme from high to low is 1+1, 1:1, 1:N, and reroutable. In addition, a protection path may be searched or allocated based on a disjointness preference order specified by a network owner or a service provider. In one embodiment, a default disjointness preference order from high to low is fully node disjointness, fully edge/link disjointness, maximally node disjointness and maximally edge/link disjointness.

In one embodiment, the disjointness preference order and/or the protection scheme priority may be specified by a network owner or service provider, which may be stored in a preference database of the network owner or service provider, such as, for example, exemplary database 104 of FIG. 1.

FIG. 16 is a block diagram illustrating an exemplary disjointness preference order and an exemplary protection scheme priority order, according to one embodiment of the invention. In one embodiment, exemplary embodiment 1600 includes, but not limited to, exemplary disjointness preference order 1601 and exemplary protection scheme priority order 1602. The exemplary disjointness preference order 1601 and exemplary protection scheme priority order 1602 may be specified by the network owner or service provider in a preference database, such as, for example, exemplary preference database 104 of FIG. 1.

In one embodiment, exemplary disjointness preference order 1601 includes, from high to low order, fully node disjointness 1603, fully edge/link disjointness 1604, maximally node disjointness 1605, and maximally edge/link disjointness 1606.

In one embodiment, exemplary protection scheme priority order 1602 includes, from high to low priority, 1+1 protection 1607, 1:1 protection 1608, 1:N protection 1609, and reroutable 1610.

According to one embodiment, when a protection path is searched but cannot be found, the protection path is searched based on the exemplary disjointness preference order and for each disjointness preference the search is conducted against other existing protection paths having lower protection scheme priority based on the exemplary protection scheme priority order 1602. If a protection path having lower protection scheme priority is found, the protection path found may be preempted or bumped. As a result, the preempted protection path may be allocated to the instant demand and a new path may be searched and allocated for the preempted path.

For example, referring to FIG. 16, when a protection path in demand for a specific protection path cannot be found, typically for a fully node disjoint protection path with respect to a working path. For the purposes of illustrations, it is assumed that a fully node disjoint protection path having a 1+1 protection scheme is demanded and cannot be found. As a result, a contention resolution is involved. During the contention resolution, a search is conducted to locate other fully node disjoint protection paths having a lower protection scheme priority. In one embodiment, the search is performed from a low to high priority of the priority of the protection scheme (e.g., protection scheme priority order 1602).

Referring back to FIG. 16, at the beginning, a search is performed to locate a reroutable path having priority 1610. If the search is successful, the located path is preempted (e.g., bumped) and assigned to the demand. Another path may be allocated for the preempted path. If the search is unsuccessful, a path having a next higher priority (e.g. fully node disjoint protection path having 1:N protection scheme) is searched, and so on.

If no protection path that satisfies a given disjointness preference (e.g., fully node disjointness 1603) having lower a priority protection scheme than the one in demand (e.g., 1:1 protection 1608, 1:N protection 1609, or reroutable 1610), another protection path that satisfies a next disjoint preference in the order (e.g., fully edge/link disjointness 1604) is searched, based on the priority order of the protection scheme 1611, again from low to high priority, and so on. If no path is found after all the disjointness in the preference order 1601 and all protection schemes for each disjoint preference have been searched, the demand is dropped.

Note that the disjoint preference order 1601 and the protection scheme priority order 1602 are shown for illustrative purposes only. The orders of the disjoint preference order 1601 and the protection scheme priority order 1602 may vary. In one embodiment, they may be determined based on the information stored in a preference database specified by a network owner or service provider (e.g., database 104 of FIG. 1).

Furthermore, the exemplary contention resolution is not limited to optical networks. It will be appreciated that the exemplary contention resolution described herein may be applied to other types of networks.

Figure 17:
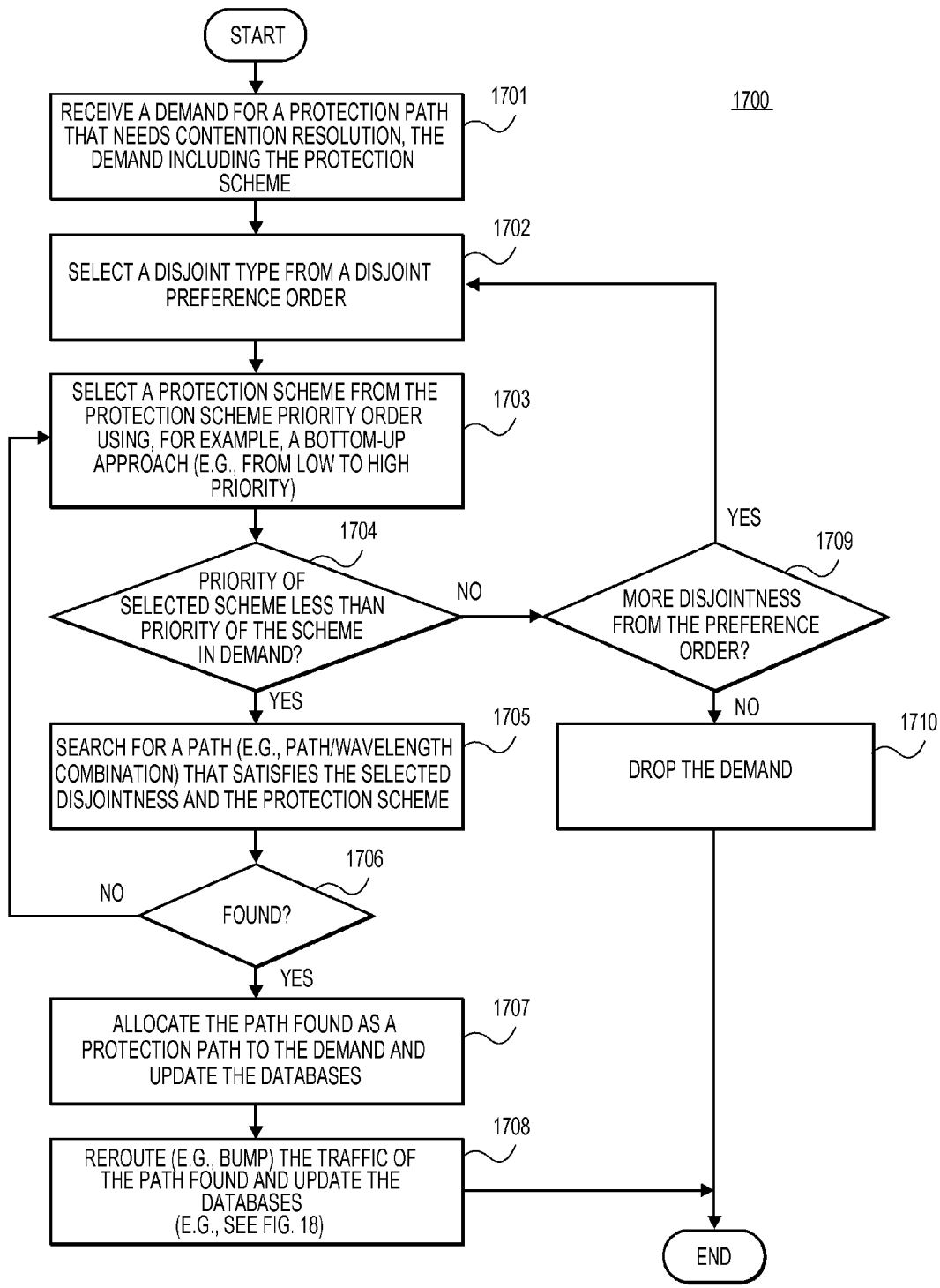
FIG. 17 is a flow diagram illustrating an exemplary process for handling a contention resolution according to one embodiment of the invention.

FIG. 17 is a flow diagram illustrating an exemplary process for handling a contention resolution according to one embodiment of the invention. The exemplary process 1700 may be performed by a processing logic that may comprise hardware (circuitry, dedicated logic, etc.), software (such as is run on a dedicated machine), or a combination of both.

Referring to FIG. 17, at block 1701, a demand for a contention resolution of a protection path is received and the demand includes the protection scheme type. At block 1702, a disjointness type from a disjoint preference order (e.g., disjoint preference order 1601) is selected. At block 1703, a protection scheme type is selected from the protection scheme priority order (e.g., protection scheme priority order 1602) using a bottom-up approach (e.g., from low priority 1610 to high priority 1607). At block 1704, it is determined whether the priority of the currently selected protection scheme priority is lower than the one in demand.

If the selected protection scheme priority is lower than the one in demand, at block 1705, a path is selected that satisfies the selected disjoint preference and the selected protection scheme priority. If, at block 1706, that such a path is found, at block 1707, the path found is preempted or bumped and assigned or allocated to the demand. The associated databases, such as, for example, those shown in FIGS. 1, 2A-2B, and 3, are updated as described above. Thereafter, at block 1708, the traffic of the preempted or bumped path may be rerouted and the associated databases are updated, which will be described in details further below.

If it is determined, at block 1704, that the selected protection scheme priority is higher than or equal to the priority in demand (e.g., all protection scheme priorities of the priority order 1602 have been searched for a given disjoint preference selected from the disjoint preference order 1601), at block 1709, it is determined whether there are more disjoint preferences that have not been processed from the disjoint preference order (e.g., disjoint preference order 1601). If so, a next disjoint preference in the order from the disjoint preference order (e.g., disjoint preference order 1601) is selected and the processes repeat from block 1702, until no more disjoint preference is left, in which case, at block 1710, the demand is dropped.

Figure 18:
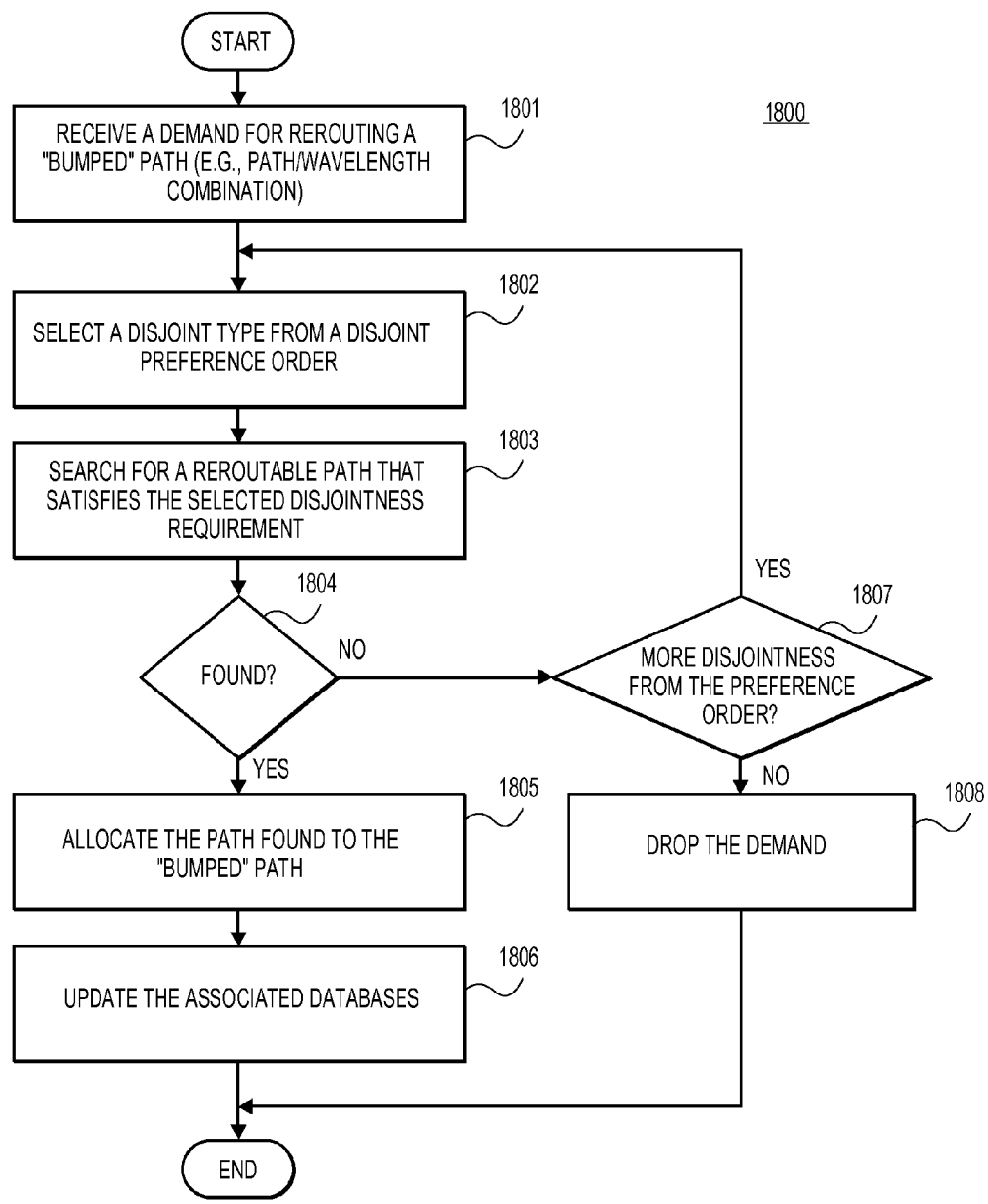
FIG. 18 is a block diagram illustrating an exemplary process for rerouting a path that has been preempted by a contention resolution, according to one embodiment of the invention.

FIG. 18 is a block diagram illustrating an exemplary process for rerouting a path that has been preempted by a contention resolution, according to one embodiment of the invention. The exemplary process 1800 may be performed by a processing logic that may comprise hardware (circuitry, dedicated logic, etc.), software (such as is run on a dedicated machine), or a combination of both. In one embodiment, the exemplary process 1800 may be a part of operations involved in block 1708 of FIG. 17.

Referring to FIG. 18, at block 1801, a demand for rerouting a preempted path is received. At block 1802, a disjoint preference is selected according to a disjoint preference order, such as, for example, disjoint preference order 1601 of FIG. 16. The preference order may be set up and stored by a network owner or service provider in a preference database, such as, for example, preference order 104 of FIG. 1. At block 1803, a reroutable path for a given disjoint preference is searched, based on, for example, the exemplary database organizations shown in FIGS. 2A-2B and 3.

At block 1804, it is determined whether such a path is found. If so, at block 1805, the path found may be allocated or assigned to the preempted path. Thereafter, at block 1806, the associated databases, such as, for example, those shown in FIGS. 1, 2A-2B, and 3, may be updated as described above. Other operations apparent to those with ordinary skill in the art may be performed.

If such a path cannot be found, at block 1807, it is determined whether there are more disjoint preferences that have not been processed. If so, a next disjoint preference in the order is selected and the processes repeat from block 1802 until all of the disjoint preferences in the order have been processed, at which case, at block 1808, the demand is dropped.

Alternative Embodiments

While various embodiments of the invention have been described, alternative embodiments of the invention may operate differently. For example, when a working path fails, the traffic of the working path is switched over to the protection path. The protection path may become a working path. The status of the protection path may be changed from allocated/protection/1+1, 1:1, or 1:N to allocated/working. A new protection path is allocated for the newly converted working path (e.g., previously protection path). When the failed working path recovers subsequently, the recovered working path may be released back to the unallocated pool for future use.

Similarly, when a protection path fails, a new protection path may be allocated to replace the failed protection path. When the failed protection path recovers subsequently, the recovered protection path may be released back to the unallocated pool. It will be appreciated that other embodiments may exist.

Thus, multiple redundancy schemes in an optical network have been described. In the foregoing specification, the invention has been described with reference to specific exemplary embodiments thereof. It will be evident that various modifications may oat be made thereto without departing from the broader spirit and scope of the invention as set forth in the following claims. The specification and drawings are, accordingly, to be regarded in an illustrative sense rather than a restrictive sense.

What is claimed is:

1. A method performed in an access node of a wave division multiplexing optical network, the method comprising:
    receiving a demand for allocating a first protection path that meets a first set of disjointness constraints with respect to a first working path according to a first protection scheme having a first priority;

in response to the demand, locating a second protection path that meets a second set of disjointness constraints with respect to a second working path according to a second protection scheme having a second priority, wherein the second protection path is a protection path for the second working path; and assigning the second protection path as a protection path to the first working path if the first priority of the first protection scheme is higher than the second priority of the second protection scheme.

2. The method of claim 1, further comprising allocating another path as a protection path for the second working path if the second protection path is assigned to the first working path.

3. The method of claim 1, wherein the priorities of the first and second protection schemes are determined based on a predetermined protection scheme priority order.

4. The method of claim 3, wherein the predetermined protection scheme priority order is specified by an owner of the optical network.

5. The method of claim 3, wherein the predetermined protection scheme priority order comprise an order from high to low priorities as of 1+1, 1:1, 1:N, and reroutable.

6. The method of claim 3, wherein the second protection path is searched and located according to the predetermined protection scheme priority order from low to high priorities.

7. The method of claim 3, wherein the second protection path is searched and located further according to a predetermined disjointness order having a plurality of disjointness preferences from most preferred disjointness to least preferred disjointness.

8. The method of claim 7, wherein the predetermined disjointness order is specified by an owner of the network.

9. The method of claim 7, wherein the predetermined disjointness order comprises an order from the most preferred to the least preferred as of fully node disjointness, fully link disjointness, maximally node disjointness, and maximally link disjointness.

10. The method of claim 7, wherein the second protection path is searched and located according to the predetermined disjointness order from the most preferred disjointness to the least preferred disjointness with respect to the first working path.

11. An apparatus, comprising:
an access node, to be coupled in a wavelength division multiplexing optical network, including,
a database to store a representation of available paths from the access node to reachable destinations, the available paths including one or more working paths protected by one or more protection paths, and
a routing module to receive a demand for a first protection path that meets a set of disjointness constraints with respect to a first working path according to a first protection scheme having a first priority, in response to the demand, locate from the database a second protection path that meets a second set of disjointness constraints with respect in a second working path according to a second protection scheme having a second priority, wherein the second protection path is a protection path for the second working path, and assign the second protection path as a protection path to the first working path if the first priority of the first protection scheme is higher than the second priority of the second protection scheme.

12. The apparatus of claim 11, wherein the routing module allocates another path as a protection path for the second working path if the second protection path is assigned to the first working path.

13. The apparatus of claim 11, wherein the priorities of the first and second protection schemes are determined based on a predetermined protection scheme priority order.

14. The apparatus of claim 13, wherein the predetermined protection scheme priority order is specified by an owner of the optical network.

15. The apparatus of claim 13, wherein the predetermined protection scheme priority order comprise an order from high to low priorities as of 1+1, 1:1, 1:N, and reroutable.

16. The apparatus of claim 13, wherein the second protection path is searched and located according to the predetermined protection scheme priority order from low to high priorities.

17. The apparatus of claim 13, wherein the second protection path is searched and located further according to a predetermined disjointness order having a plurality of disjointness preferences from most preferred disjointness to least preferred disjointness.

18. The apparatus of claim 17, wherein the predetermined disjointness order is specified by an owner of the network.

19. The apparatus of claim 17, wherein the predetermined disjointness order comprises an order from the most preferred to the least preferred as of fully node disjointness, fully link disjointness, maximally node disjointness, and maximally link disjointness.

20. The apparatus of claim 17, wherein the second protection path is searched and located according to the predetermined disjointness order from the most preferred disjointness to the least preferred disjointness with respect to the first working path.

21. A method performed in an access node of a wave division multiplexing optical network, the method comprising:
searching, in response to a demand for a first protection path that meets a first set of disjointness constraints with respect to a first working path, in a database for the first protection path that meets the first set of disjointness constraints;
if the first protection path cannot be located, searching for a second protection path that meets a second set of disjointness constraints and is currently assigned as a protection path for second working path, the second set of disjointness constraints being determined according to a disjointness preference order specified by an owner of the network; and
assigning the second protection path as a protection path to the first working path if the first priority of the first protection scheme of the first working path is higher than the second priority of the second protection scheme of the second working path.

22. The method of claim 21, wherein the disjointness preference order comprises an order from the most preferred to the least preferred as of fully node disjointness, fully link disjointness, maximally node disjointness, and maximally link disjointness.

23. The method of claim 22, wherein the second protection path is searched from the most preferred disjointness to the least preferred disjointness with respect to the working path.

24. An apparatus, comprising:
an access node, to be coupled in a wavelength division multiplexing optical network, including,
a database to store a representation of available paths from the access node to reachable destinations, the available paths including one or more working paths protected by one or more protection paths, and a routing module to search, in response to a demand for a protection path that meets a first set of disjointness constraints with respect to a first working path, in a database for a first protection path that meets the first set of disjointness constraints, if the first protection path cannot be located, search for a second protection path that meets a second set of disjointness constraints and is currently assigned as a protection path for second working path, the second set of disjointness constraints being determined according to a disjointness preference order specified by an owner of the network, and assign the second protection path as a protection path to the first working path if the first priority of the first protection scheme of the first working path is higher than the second priority of the second protection scheme of the second working path.

25. The apparatus of claim 24, wherein the disjointness preference order comprises an order from the most preferred to the least preferred as of fully node disjointness, fully link disjointness, maximally node disjointness, and maximally link disjointness.

26. The apparatus of claim 25, wherein the second protection path is searched from the most preferred disjointness to the Least preferred disjointness with respect to the working path.

27. A method performed in an access node of a wave division multiplexing optical network, the method comprising:

receiving a demand for a first protection path associated with a first working path according to a first protection scheme having a first priority, and preempting a second protection path that is a protection path of a second working path according to a second protection scheme having a second priority, if the first priority is higher than a second priority according to a protection scheme priority order specified by an owner of the network; and assigning the second protection path as a protection path to the first working path if the first priority of the first protection scheme is higher than the second priority of the second protection scheme.

28. The method of claim 27, wherein the protection scheme priority order comprise an order from high to low priorities as of 1+1, 1:1, 1:N, and reroutable.

29. The method of claim 27, wherein the second protection path is searched and located according to the protection scheme priority order from low to high priorities.

30. An apparatus, comprising:

an access node, to be coupled in a wavelength division multiplexing optical network, including, a database to store a representation of available paths from the access node to reachable destinations, the available paths including one or more working paths protected by one or more protection paths, and a routing module to receive a demand for a first protection path that is a protection path of a first working path according to a first protection scheme having a first priority, preempt a second protection path associated with a second working path according to a second protection scheme having a second priority, if the first priority is higher than a second priority according to a protection scheme priority order specified by an owner of the network, and assign the second protection path as a protection path to the first working path if the first priority of the first protection scheme is higher than the second priority of the second protection scheme.

31. The apparatus of claim 30, wherein the protection scheme priority order comprise an order from high to low priorities as of 1+1, 1:1, 1:N, and reroutable.

32. The apparatus of claim 30, wherein the second protection path is searched and located according to the protection scheme priority order from low to high priorities.

* * * * *

UNITED STATES PATENT AND TRADEMARK OFFICE
CERTIFICATE OF CORRECTION

| | | |
|---|---|---|
| PATENT NO. | : 7,697,455 B2 | |
| APPLICATION NO. | : 10/781080 | |
| DATED | : April 13, 2010 | |
| INVENTOR(S) | : Santosh Kumar Sadanada | |

It is certified that error appears in the above-identified patent and that said Letters Patent is hereby corrected as shown below:

In the drawings, Sheet 3, Figure 2B, add "..." in box 257.

In the drawings, Sheet 10, Figure 9, delete "SIGNALLING" and add "SIGNALING".

In the drawings, Sheet 10, Figure 9, add "YES" next to down arrow between block 903 and block 904.

In the drawings, Sheet 10, Figure 9, add "NO" next to arrow between block 908 and block 911.

In the drawings, Sheet 10, Figure 9, add "YES" next to down arrow between block 908 and block 909.

See attachments.

Signed and Sealed this

Twenty-seventh Day of July, 2010

David J. Kappos
*Director of the United States Patent and Trademark Office*

| PATH 251 | LAMBDA 252 | LAMBDA STATUS 253 | COUNT OF 1:N 254 | PRIORITY OF WP FOR 1:N 255 | PRIORITIES OF WPS SHARED IN 1:N 256 | 257 |
|---|---|---|---|---|---|---|
| PATH 1 | LAMBDA 1 | ALLOCATED/WORKING | | 2 | | |
| PATH 1 | LAMBDA 2 | UNALLOCATED | | | | |
| ... | ... | | | | | |
| PATH 2 | LAMBDA 1 | ALLOCATED/WORKING | | 3 | | |
| PATH 2 | LAMBDA 2 | BROKEN | | | | |
| ... | ... | | | | | |
| PATH 3 | LAMBDA 1 | ALLOCATED/WORKING | | 5 | | |
| PATH 3 | LAMBDA 2 | ALLOCATED/WORKING | | | | |
| PATH n | LAMBDA 1 | ALLOCATED/PROTECTION/1:1 | | | | |
| PATH n | LAMBDA 2 | ALLOCATED/PROTECTION/1:N | 3 | | 2, 3, 5 | |
| ... | ... | ... | ... | ... | ... | ... |

CONNECTIVITY/ROUTING DATABASE(S) 250

FIG. 2B